United States Patent
Nett et al.

(10) Patent No.: US 12,319,758 B2
(45) Date of Patent: Jun. 3, 2025

(54) STERICALLY HINDERED PHOSPHINO-UREA SUPPORTED NICKEL (II) OR PALLADIUM (II) CATALYSTS FOR THE COPOLYMERIZATION OF ETHYLENE AND POLAR COMONOMERS

(71) Applicant: Dow Global Technologies LLC, Midland, MI (US)

(72) Inventors: Alex J. Nett, Midland, MI (US); Heather A. Spinney, Midland, MI (US); Todd D. Senecal, Midland, MI (US); David R. Wilson, Midland, MI (US); Robert DJ Froese, Midland, MI (US); Alejandro J. Garza Gonzalez, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 434 days.

(21) Appl. No.: 17/907,727

(22) PCT Filed: Mar. 31, 2021

(86) PCT No.: PCT/US2021/025161
§ 371 (c)(1),
(2) Date: Sep. 29, 2022

(87) PCT Pub. No.: WO2021/202722
PCT Pub. Date: Oct. 7, 2021

(65) Prior Publication Data
US 2023/0129371 A1    Apr. 27, 2023

Related U.S. Application Data

(60) Provisional application No. 63/002,767, filed on Mar. 31, 2020.

(51) Int. Cl.
| | | |
|---|---|---|
| C08F 4/80 | (2006.01) | |
| B01J 31/18 | (2006.01) | |
| C07F 15/04 | (2006.01) | |
| C08F 210/02 | (2006.01) | |

(52) U.S. Cl.
CPC ........... *C08F 210/02* (2013.01); *B01J 31/188* (2013.01); *C07F 15/04* (2013.01); *C08F 4/80* (2013.01)

(58) Field of Classification Search
None
See application file for complete search history.

(56) References Cited

U.S. PATENT DOCUMENTS

| | | |
|---|---|---|
| 8,618,319 B2 | 12/2013 | Shimizu et al. |
| 2017/0306134 A1 | 10/2017 | Hattori et al. |
| 2018/0201704 A1 | 7/2018 | Sato et al. |
| 2019/0262818 A1 | 8/2019 | Chikkali et al. |

FOREIGN PATENT DOCUMENTS

| | | |
|---|---|---|
| CN | 1066320507 B | 5/2017 |
| CN | 108017670 A | 5/2018 |
| CN | 109320558 A | 2/2019 |

OTHER PUBLICATIONS

Baulina, T. V. et al., "One-Pot Synthesis of N-Diphenylphosphorylureas". Doklady Chemistry 2006, 409(2), 129-132. (Year: 2006).*
Brazilian Technical Report dated Oct. 14, 2024, pertaining to BR Patent Application No. BR 112022019619-9, 8 pgs.
Chinese Office Action dated Jul. 12, 2024, pertaining to CN Patent Application No. 2021800325247, 6 pgs.
Chinese Office Action dated Sep. 22, 2023, pertaining to CN Patent Application No. 202180024141.5, 12 pgs.
Behr et al. "Stoichiometric Insertion of Carbon Dioxide and Ethylene into Nickel-Carbon Bonds", Journal of Organometallic Chemistry, 249 (1983) pp. C38-C40.
Keim et al. "Reactions of Chelate Ylides with Nickel(0) Complexes", Organometallics 1986, 5, pp. 2356-2359.
English et al. "Recombinant and in vitro expression systems for hydrogenases: new frontiers in basic and applied studies for biological and synthetic H2 production", Dalton Trans., 2009, 814-822, abstract only.
Meeuwissen et al. "Phosphinoureas: Cooperative Ligands in Rhodium-Catalyzed Hydroformylation? On the Possibility of a Ligand-Assisted Reductive Elimination of the Aldehyde", Organometallics 2010, 29, pp. 2413-2421.
Xin et al. "Nickel Catalyzed Copolymerization of Ethylene and Alkyl Acrylates", J. Am. Chem. Soc. 2017, 139, pp. 3611-3614.
Communication pursuant to Rules 161(1) and 162 EPC, dated Nov. 11, 2022, pertaining to European Patent Application No. 21720637.4, 3 pages.
Brazil Technical Report dated Sep. 26, 2024, pertaining to BR Patent Application No. BR 11 2022 018724.6, 8 pgs.
Klabunde et al. "Nickel Catalysis for Ethylene Homo- and Co-Polymerization", Journal of Molecular Catalysis, 41 (1987) 123-134.

(Continued)

*Primary Examiner* — Richard A. Huhn
(74) *Attorney, Agent, or Firm* — Dinsmore & Shohl LLP

(57) ABSTRACT

Processes of polymerizing olefin monomers using catalyst systems and catalysts systems that include a procatalyst having a structure according to formula (I):

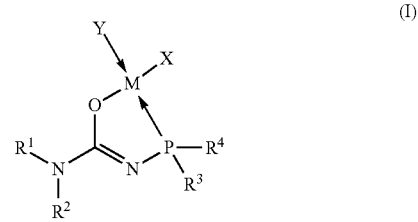

20 Claims, No Drawings

(56) References Cited

OTHER PUBLICATIONS

Kuhl "N-phosphino carboxylic acid amides, lactams and ureas: Synthesis, properties and applications", Coordination Chemistry Reviews 250 (2006) 2867-2915.

International Search Report and Written Opinion dated Jul. 2, 2021, pertaining to Int'l Patent Application No. PCT/US2021/025161, 76 pgs.

Cui et al. "A N-bridged strategy enables hemilabile phosphine-carbonyl palladium and nickel catalysts to mediate ethylene polymerization and copolymerization with polar vinyl monomers", Polym. Chem. 2020, 11, 6187.

International Search Report and Written Opinion dated Jul. 2, 2021, pertaining to Int'l Patent Application No. PCT/US2021/025152, 16 pgs.

Chinese Office Action dated Jan. 6, 2024, pertaining to CN Patent Application No. 2021800325247, 10 pgs.

Chinese Office Action dated Apr. 29, 2024, pertaining to CN Patent Application No. 2021800241415, 6 pgs.

U.S. Notice of Allowance dated Feb. 6, 2025, pertaining to U.S. Appl. No. 17/907,730, 10 pgs.

Agonstinho, M. et al., "Synthesis and characterization of Co and Ni complexes stabilized by keto-and acetamide-derived P, O-type phosphine ligands", Dalton Transactions, 2009, pp. 814-822 (2009).

Japanese Office Action dated Mar. 25, 2025, pertaining to JP Patent Application No. 2022-555191, 6 pgs.

Japanese Office Action dated Mar. 25, 2025, pertaining to JP Patent Application No. 2022-555187, 6 pgs.

* cited by examiner

STERICALLY HINDERED PHOSPHINO-UREA SUPPORTED NICKEL (II) OR PALLADIUM (II) CATALYSTS FOR THE COPOLYMERIZATION OF ETHYLENE AND POLAR COMONOMERS

CROSS REFERENCE TO RELATED APPLICATIONS

This application is a national stage entry of PCT/US2021/025161 filed on Mar. 31, 2021, which claims priority to U.S. Provisional Patent Application No. 63/002,767 filed on Mar. 31, 2020, the entire disclosures of which are hereby incorporated by reference.

TECHNICAL FIELD

Embodiments of the present disclosure relate generally to ethylene and polar comonomer polymerization catalyst systems and processes, and, more specifically, to ethylene and acrylate copolymerization catalyst systems including sterically hindered phosphino-urea supported nickel(II) catalysts and to olefin polymerization processes incorporating the catalyst systems.

BACKGROUND

Commercially, ethylene/acrylate copolymers are formed through high-pressure and/or high-temperature radical processes and have a highly branched microstructure similar to that of low-density polyethylene (LDPE). Coordination catalysis provides routes to highly linear ethylene/acrylate copolymers with structures similar to that of linear low-density polyethylene (LLDPE). The linear ethylene/acrylate copolymers formed by coordination catalysis exhibit greater crystallinity and higher thermal resistance than those of the copolymers formed through radical processes.

Common organometallic coordination catalysts appropriate for ethylene polymerization are not compatible with systems including acrylates as comonomers. For example, the Group IV metal catalysts (Ti, Zr, Hf) used in the industrial manufacture of LLDPE (ethylene/α-olefin copolymers) are not compatible with polar olefin monomers, including acrylates. Because the oxygen atoms of acrylates strongly coordinate to Lewis-acidic Group IV metals, during ethylene/acrylate polymerization the active site of the metal becomes blocked by the acrylate and further olefin polymerization is hindered.

Owing to the incompatibility of the Group IV metal catalysts with acrylates, electron-rich metal catalysts containing Group 10 metals (Pd, Ni) have been explored in the copolymerization reactions of ethylene with acrylate monomers. However, many reported Ni- and Pd-containing metal catalysts suffer from (a) slow rates of polymerization and/or (b) low incorporation of the polar monomers of interest.

SUMMARY

Ongoing needs exist to create a ligand framework for Ni and Pd catalysts that promotes both high rates of ethylene copolymerization activity and high incorporation of the acrylate comonomer. With a ligand framework for nickel or palladium, ethylene and polar monomers may be copolymerized via coordination catalysis to form a highly linear, LLDPE-like copolymer. The highly linear copolymers may exhibit improved creep resistance and dimensional stability at higher application temperatures, specifically, from 80° C. to 150° C., as opposed to temperatures of less than 80° C.

Embodiments of this disclosure include catalyst systems. The catalyst systems include a procatalyst having a structure according to formula (I):

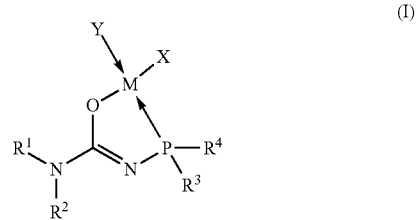

(I)

In formula (I), M is nickel(II) or palladium(II); X is a ligand chosen from $(C_1-C_{40})$hydrocarbyl, $(C_1-C_{40})$heterohydrocarbyl, $-CH_2Si(R^C)_{3-Q}(OR^C)_Q$, $-Si(R^C)_{3-Q}(OR^C)_Q$, $-OSi(R^C)_{3-Q}(OR^C)_Q$, $-Ge(R^C)_{3-Q}(OR^C)_Q$, $-P(R^C)_{2-W}(OR^C)_W$, $-P(O)(R^C)_{2-W}(OR^C)_W$, $-N(R^C)_2$, $-N(Si(R^C)_3)_2$, $-NR^CSi(R^C)_3$, $-OR^C$, $-SR^C$, $-NO_2$, $-CN$, $-CF_3$, $-OCF_3$, $-S(O)R^C$, $-S(O)_2R^C$, $-OS(O)_2R^C$, $-N=C(R^C)_2$, $-N=CH(R^C)$, $-N=CH_2$, $-N=P(R^C)_3$, $-OC(O)R^C$, $-C(O)OR^C$, $-C(O)R^C$, $-C(O)H$, $-N(R^C)C(O)R^C$, $-N(R^C)C(O)H$, $-NHC(O)R^C$, $-NHC(O)H$, $-C(O)N(R^C)_2$, $-C(O)NHR^C$, $-C(O)NH_2$, halogen or a hydrogen. Each $R^C$, in formula (I), is independently $(C_1-C_{30})$hydrocarbyl optionally substituted with one or more $R^S$ or $(C_1-C_{30})$heterohydrocarbyl optionally substituted with one or more $R^S$. The subscript Q in various ligands X is 0, 1, 2 or 3. The subscript W in various ligands X is 0, 1 or 2. Y is a Lewis base. Optionally, Y and X are covalently connected.

In formula (I), $R^1$ and $R^2$ are chosen from $(C_6-C_{40})$aryl or $(C_1-C_{40})$heteroaryl, either of which may be optionally substituted with one or more $R^S$. $R^3$ and $R^4$ are independently selected from radicals having formula (II):

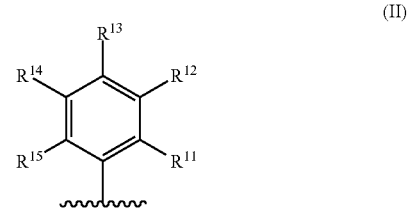

(II)

In formula (II), $R^{11}$, $R^{12}$, $R^{13}$, $R^{14}$, and $R^{15}$ are independently $(C_1-C_{30})$hydrocarbyl $(C_1-C_{30})$heterohydrocarbyl, $-OR^N$, $-NR^N_2$, $-SR^N$, halogen, or $-H$, provided that at least one of $R^{11}$ and $R^{15}$ is not $-H$.

In formula (I), each $R^S$ in formula (I) is independently $(C_1-C_{20})$hydrocarbyl or halogen.

Embodiments of this disclosure include a polymerization process. The polymerization process includes polymerizing ethylene and one or more polar monomers in the presence of a catalyst system under olefin polymerization conditions to form a polar ethylene-based copolymer. The catalyst system includes a metal-ligand complex according to formula (I) of this disclosure.

DETAILED DESCRIPTION

Specific embodiments of catalyst systems will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

Common abbreviations are listed below:

Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); THF: tetrahydrofuran; $Et_2O$: diethyl ether; $CH_2Cl_2$: dichloromethane; EtOAc: ethyl acetate; $C_6D_6$: deuterated benzene or benzene-d6: $CDCl_3$: deuterated chloroform; $Na_2SO_4$: sodium sulfate; $MgSO_4$: magnesium sulfate; HCl: hydrogen chloride; n-BuLi: butyllithium; t-BuLi: tert-butyllithium; $K_2CO_3$: potassium carbonate; $N_2$: nitrogen gas; PhMe: toluene; PPR: parallel pressure reactor; MAO: methylaluminoxane; MMAO: modified methylaluminoxane; GC: gas chromatography; LC: liquid chromatography; NMR: nuclear magnetic resonance; MS: mass spectrometry; mmol: millimoles; mL: milliliters; M: molar; min or mins: minutes; h or hrs: hours; d: days; Rf: retention factor; TLC: thin-layer chromatography; rpm: revolutions per minute.

The term "independently selected" followed by multiple options is used herein to indicate that individual groups appearing before the term, such as $R^1$, $R^2$, $R^3$, $R^4$, and $R^C$, can be identical or different, without dependency on the identity of any other group also appearing before the term.

The term "procatalyst" refers to a compound that has catalytic activity after activation, for example upon removal of the Lewis base coordinated to the Ni or Pd metal center.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{50})$alkyl is an alkyl group having from 1 to 50 carbon atoms in its unsubstituted form. In some embodiments and general structures, certain chemical groups may be substituted by one or more substituents such as $R^S$ wherein $R^S$ generically represents any substituent defined in this application. An $R^S$ substituted version of a chemical group defined using the "$(C_x-C_y)$" parenthetical may contain more than y carbon atoms depending on the identity of any groups $R^S$. For example, a "$(C_1-C_{50})$alkyl substituted with exactly one group $R^S$, where $R^S$ is phenyl (—$C_6H_5$)" may contain from 7 to 56 carbon atoms. Thus, in general when a chemical group defined using the "$(C_x-C_y)$" parenthetical is substituted by one or more carbon atom-containing substituents $R^S$, the minimum and maximum total numbers of carbon atoms of the chemical group are determined by adding to both x and y, respectively, the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g., $R^S$). The term "persubstitution" or "persubstituted" means that every hydrogen atom (H) bonded to a carbon atom or heteroatom of a corresponding unsubstituted compound or functional group is replaced by a substituent (e.g., $R^S$). Thus, a "perfluorinated alkyl" is an alkyl group in which every hydrogen atom is replaced by a fluorine atom. The term "polysubstitution" means that at least two, but fewer than all, hydrogen atoms bonded to carbon atoms or heteroatoms of a corresponding unsubstituted compound or functional group are replaced by a substituent. The term "—H" means a hydrogen or hydrogen radical that is covalently bonded to another atom. "Hydrogen" and "—H" are interchangeable, and unless clearly specified, have identical meanings.

The term "$(C_1-C_{50})$hydrocarbyl" means a hydrocarbon radical of from 1 to 50 carbon atoms and the term "$(C_1-C_{50})$hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a $(C_1-C_{50})$hydrocarbyl includes, without limitation, unsubstituted or substituted forms of the following groups: $(C_1-C_{50})$alkyl, $(C_3-C_{50})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene (such as benzyl (—$CH_2$—$C_6H_5$)).

The terms "$(C_1-C_{50})$alkyl" and "$(C_1-C_{18})$alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. The radical may be on any one carbon atom of the alkyl. Examples of unsubstituted $(C_1-C_{50})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 2,2-dimethylpropyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $[C_n]$alkyl. The term "$[C_n]$alkyl" means the radical, including substituents, contains up to a maximum of n carbon atoms wherein n is an integer from 1 to 45. For example, a $[C_{45}]$alkyl is, for example, a $(C_{27}-C_{40})$alkyl substituted by one $R^S$, which is a $(C_1-C_5)$alkyl, or is, for example a $(C_{15}-C_{25})$alkyl substituted by two $R^S$ groups, which are each a $(C_1-C_{10})$alkyl. Examples of $(C_1-C_5)$alkyl include methyl, ethyl, 1-propyl, 1-methylethyl, 2,2-dimethylpropyl; or 1,1-dimethylethyl. 1,1-Dimethylethyl is a four-carbon alkyl having its radical on the tertiary carbon. The term "tertiary carbon atom" refers to a carbon atom that is covalently bonded to three other carbon atoms.

The term "$(C_6-C_{50})$aryl" means an unsubstituted or substituted (by one or more $R^S$) monocyclic, bicyclic, or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted $(C_6-C_{50})$aryl include: unsubstituted $(C_6-C_{20})$aryl, unsubstituted $(C_6-C_{18})$aryl; 2-$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; anthracenyl; and phenanthrenyl. Examples of substituted $(C_6-C_{40})$aryl include: substituted $(C_1-C_{20})$aryl; substituted $(C_6-C_{18})$aryl; 2,4-bis([$C_{20}$]alkyl)-phenyl; 3,5-bis([$C_{20}$]alkyl)-phenyl; pentafluorophenyl; and fluoren-9-one-1-yl.

The term "$(C_3-C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{50})$hydrocarbylene include, without limitation, unsubstituted or substituted forms of groups such as $(C_6-C_{50})$arylene, $(C_3-C_{50})$cycloalkylene, and $(C_1-C_{50})$alkylene (e.g., $(C_1-C_{20})$alkylene). The diradicals may be on the same carbon atom (e.g., —CH$_2$—) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1,3-, 1,4-, or an α,ω-diradical, and others a 1,2-diradical. The α,ω-diradical is a diradical that has maximum carbon backbone spacing between the radical carbons. Some examples of $(C_2-C_{20})$alkylene α,ω-diradicals include ethan-1,2-diyl (i.e., —CH$_2$CH$_2$—), propan-1,3-diyl (i.e., —CH$_2$CH$_2$CH$_2$—), 2-methylpropan-1,3-diyl (i.e., —CH$_2$CH(CH$_3$)CH$_2$—). Some examples of $(C_6-C_{50})$arylene α,ω-diradicals include phenyl-1,4-diyl, naphthalen-2,6-diyl, or naphthalen-3,7-diyl.

The term "$(C_1-C_{50})$alkylene" means a saturated straight chain or branched chain diradical (i.e., the radicals are not on ring atoms) of from 1 to 50 carbon atoms that is unsubstituted or substituted by one or more $R^S$. Examples of unsubstituted $(C_1-C_{50})$alkylene are unsubstituted $(C_1-C_{20})$alkylene, including unsubstituted —CH$_2$CH$_2$—, —(CH$_2$)$_3$—, —(CH$_2$)$_4$—, —(CH$_2$)$_5$—, —(CH$_2$)$_6$—, —(CH$_2$)$_7$—, —(CH$_2$)$_8$—, —CH$_2$C*HCH$_3$, and —(CH$_2$)$_4$C*(H)(CH$_3$), in which "C*" denotes a carbon atom from which a hydrogen atom is removed to form a secondary or tertiary alkyl radical. Examples of substituted $(C_1-C_{50})$alkylene are substituted $(C_1-C_{20})$alkylene, —CF$_2$—, —C(O)—, and —(CH$_2$)$_{14}$C(CH$_3$)$_2$(CH$_2$)$_5$— (i.e., a 6,6-dimethyl substituted 1,20-eicosylene). Examples of substituted $(C_1-C_{50})$alkylene also include 1,2-cyclopentanediylbis(methylene), 1,2-cyclohexanediylbis(methylene), 7,7-dimethyl-bicyclo[2.2.1]heptane-2,3-diylbis(methylene), and bicyclo[2.2.2]octane-2,3-diylbis(methylene).

The term "$(C_3-C_{50})$cycloalkylene" means a cyclic diradical (i.e., the radicals are on ring atoms) of from 3 to 50 carbon atoms that is unsubstituted or substituted by one or more $R^S$.

The term "heteroatom," refers to an atom other than hydrogen or carbon. Examples of groups containing one or more than one heteroatom include —O—, —S—, —S(O)—, —S(O)$_2$—, —Si(R$^C$)$_2$—, —P(R$^P$)—, —P(R$^P$)$_2$, —P(O)(R$^P$)$_2$, —N(R$^N$)—, —N(R$^N$)$_2$, —N=C(R$^C$)$_2$, —N=C(NR$^N$$_2$)(R$^C$), —Ge(R$^C$)$_2$—, or —Si(R$^C$)$_3$, where each R$^C$ and each R$^P$ is unsubstituted $(C_1-C_{18})$hydrocarbyl or —H, and where each R is unsubstituted $(C_1-C_{18})$hydrocarbyl. The term "heterohydrocarbon" refers to a molecule or molecular framework in which one or more carbon atoms of a hydrocarbon are replaced with a heteroatom. The term "$(C_1-C_{50})$heterohydrocarbyl" means a heterohydrocarbon radical of from 1 to 50 carbon atoms, and the term "$(C_1-C_{50})$heterohydrocarbylene" means a heterohydrocarbon diradical of from 1 to 50 carbon atoms. The heterohydrocarbon of the $(C_1-C_{50})$heterohydrocarbyl or the $(C_1-C_{50})$heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical on a different heteroatom. Each $(C_1-C_{50})$heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The $(C_1-C_{50})$heterohydrocarbyl may be unsubstituted or substituted. Non-limiting examples of the $(C_1-C_{50})$heterohydrocarbyl include $(C_1-C_{50})$heteroalkyl, $(C_1-C_{50})$hydrocarbyl-O—, $(C_1-C_{50})$hydrocarbyl-S—, $(C_1-C_{50})$hydrocarbyl-S(O)—, $(C_1-C_{50})$hydrocarbyl-S(O)$_2$—, $(C_1-C_{50})$hydrocarbyl-Si(R$^C$)$_2$—, $(C_1-C_{50})$hydrocarbyl-N(R$^N$)—, $(C_1-C_{50})$hydrocarbyl-P(R$^P$)—, $(C_2-C_{50})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{50})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene. Additional examples include, but are not limited to —Si(R$^C$)$_{3-Q}$(OR$^C$)$_Q$, —OSi(R$^C$)$_{3-Q}$(OR$^C$)$_Q$, —Ge(R$^C$)$_{3-Q}$(OR$^C$)$_Q$, —P(R$^C$)$_{2-W}$(OR$^C$)$_W$, —P(O)(R$^C$)$_{2-W}$(OR$^C$)$_W$, —N(R$^C$)$_2$, —NH(R$^C$)$_2$, —OR$^C$, —SR$^C$, —NO$_2$, —CN, —CF$_3$, —OCF$_3$, —S(O)R$^C$, —S(O)$_2$R$^C$, —OS(O)$_2$R$^C$, —N=C(R$^C$)$_2$, —N=P(R$^C$)$_3$, —OC(O)R$^C$, —C(O)R$^C$, —C(O)OR$^C$, —N(R$^C$)C(O)R$^C$, and —C(O)N(R$^C$)$_2$.

The term "$(C_4-C_{50})$heteroaryl" means an unsubstituted or substituted (by one or more $R^S$) monocyclic, bicyclic, or tricyclic heteroaromatic hydrocarbon radical of from 1 to 50 total carbon atoms and from 1 to 10 heteroatoms. The radical of the heteroaryl may be on a carbon atom or a heteroatom. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclic heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring. The 5-membered ring has 5 minus h carbon atoms, wherein h is the number of heteroatoms and may be 1, 2, 3, or 4; and each heteroatom independently may be O, S, N, or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1, 2 or 3 and the heteroatoms may be N or P. Examples of 6-membered ring heteroaromatic hydrocarbon radicals include pyridine-2-yl; pyrimidin-2-yl; pyrazin-2-yl; 1,3,5-triazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazol-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f] indol-1-yl. An example of the fused 6,5,6-ring system is 9H-carbazol-9-yl. An example of the fused 6,6,6-ring system is acrydin-9-yl.

The term "$(C_1-C_{50})$heteroalkyl" means a saturated straight or branched chain radical containing 1 to 50 carbon atoms, and one or more of the heteroatoms. The term "$(C_1-C_{50})$heteroalkylene" means a saturated straight or branched chain diradical containing from 1 to 50 carbon atoms and one or more than one heteroatom. The heteroatoms of the heteroalkyls or the heteroalkylenes may include, but are not limited to, $Si(R^C)_3$, $Ge(R^C)_3$, $Si(R^C)_2$, $Ge(R^C)_2$, $P(R^P)_2$, $P(R^P)$, $P(O)(R^P)_2$, $N(R^N)_2$, $N(R^N)$, N, O, $OR^C$, S, $SR^C$, $S(O)$, and $S(O)_2$, wherein each of the heteroalkyl and heteroalkylene groups are unsubstituted or are substituted by one or more $R^S$.

Examples of unsubstituted $(C_2-C_{40})$heterocycloalkyl include unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S, S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means the anionic form of the halogen atom: fluoride (F⁻), chloride (Cl⁻), bromide (Br⁻), or iodide (I⁻).

The term "saturated" means lacking carbon-carbon double bonds, carbon-carbon triple bonds, and (in heteroatom-containing groups) carbon-nitrogen, carbon-phosphorus, nitrogen-nitrogen, nitrogen-phosphorus, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, or (in heteroatom-containing groups) one or more carbon-nitrogen, carbon-phosphorus, nitrogen-nitrogen, nitrogen-phosphorus, or carbon-silicon double bonds, not including double bonds that may be present in substituents $R^S$, if any, or in (hetero) aromatic rings, if any.

Embodiments of this disclosure include catalyst systems. The catalyst system includes a procatalyst having a structure according to formula (I):

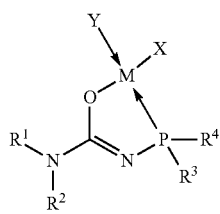
(I)

In formula (I), M is nickel(II); or Pd (II); X is a ligand chosen from $(C_1-C_{40})$hydrocarbyl, $(C_1-C_{40})$heterohydrocarbyl, $-CH_2Si(R^C)_{3-Q}(OR^C)_Q$, $-Si(R^C)_{3-Q}(OR^C)_Q$, $-OSi(R^C)_{3-Q}(OR^C)_Q$, $-Ge(R^C)_{3-Q}(OR^C)_Q$, $-P(R^C)_{2-W}(OR^C)_W$, $-P(O)(R^C)_{2-W}(OR^C)_W$, $-N(R^C)_2$, $-N(Si(R^C)_3)_2$, $-NR^CSi(R^C)_3$, $-OR^C$, $-SR^C$, $-NO_2$, $-CN$, $-CF_3$, $-OCF_3$, $-S(O)R^C$, $-S(O)_2R^C$, $-OS(O)_2R^C$, $-N=C(R^C)_2$, $-N=CH(R^C)$, $-N=CH_2$, $-N=P(R^C)_3$, $-OC(O)R^C$, $-C(O)OR^C$, $-C(O)R^C$, $-C(O)H$, $-N(R^C)C(O)R^C$, $-N(R^C)C(O)H$, $-NHC(O)R^C$, $-NHC(O)H$, $-C(O)N(R^C)_2$, $-C(O)NHR^C$, $-C(O)NH_2$, halogen or a hydrogen, wherein each $R^C$ is independently $(C_1-C_{30})$hydrocarbyl optionally substituted with one or more $R^S$ or $(C_1-C_{30})$heterohydrocarbyl optionally substituted with one or more $R^S$, where subscript Q is 0, 1, 2 or 3; where subscript W is 0, 1 or 2. Y is a Lewis base; and optionally, Y and X are covalently connected.

In one or more embodiments, $R^1$ and $R^2$ are chosen from $(C_6-C_{40})$aryl, $(C_1-C_{40})$heteroaryl, and are optionally substituted with one or more $R^S$.

In embodiments, $R^3$ and $R^4$ are independently selected from radicals having formula (II):

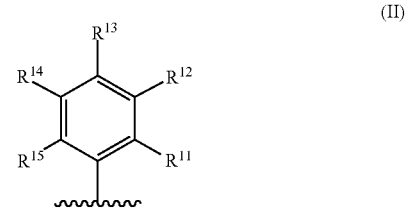
(II)

In formula (II), $R^{11}$, $R^{12}$, $R^{13}$, $R^{14}$, and $R^{15}$ are independently $(C_1-C_{30})$hydrocarbyl, $(C_1-C_{30})$heterohydrocarbyl, $-OR^N$, $-NR^N_2$, or $-SR^N$, where $R^N$ is $(C_1-C_{30})$hydrocarbyl, with the proviso that at least one of $R^{11}$ and $R^{15}$ is not $-H$.

In one or more embodiments, in formula (I), $R^1$ and $R^2$ are identical. In one or more embodiments, in formula (I), $R^3$ and $R^4$ are identical.

In various embodiments, in formula (I), $R^{11}$ and $R^{15}$ are independently $-O[(C_1-C_{10})$alkyl]. In some embodiments, $R^{11}$ and $R^{15}$ are methoxy or ethoxy. In other embodiments, $R^{11}$ and $R^{15}$ are independently $-N[(C_1-C_{10})$alkyl]$_2$.

In one or more embodiments, $R^1$ and $R^2$ are $(C_6-C_{40})$aryl substituted with at least one $R^S$, where each $R^S$ is independently $(C_1-C_{30})$hydrocarbyl, $-CF_3$, or halogen atom. In some embodiments, $R^1$ and $R^2$ are independently phenyl, 3,5-bis(trifluoromethyl)phenyl, or 3,5-di-tert-butylphenyl.

In various embodiments, $R^1$ and $R^2$ are connected and the procatalyst has the structure according to formula (III):

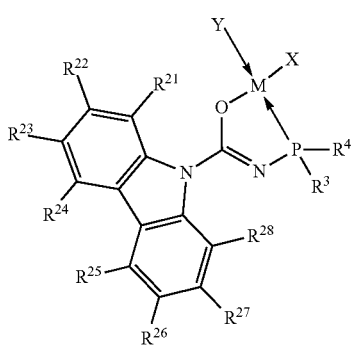
(III)

In formula (III), each of $R^{21-28}$ is independently chosen from —H, $(C_1-C_{40})$hydrocarbyl, $(C_1-C_{40})$heterohydrocarbyl, —Si$(R^R)_3$, —Ge$(R^R)_3$, —P$(R^R)_2$, —P(O)$(R^R)_2$, —N$(R^R)_2$, —OR$^R$, —SR$^R$, —NO$_2$, —CN, —CF$_3$, or halogen, where each $R^R$ is $(C_1-C_{30})$hydrocarbyl, $(C_1-C_{30})$heterohydrocarbyl, or —H; and M, Y, X, $R^3$, and $R^4$ are as defined in formula (I).

In various embodiments, in formula (III), $R^{22}$ and $R^{27}$ are independently $(C_6-C_{40})$aryl optionally substituted with $R^S$, where $R^S$ is $(C_1-C_{30})$hydrocarbyl, —CF$_3$, or halogen atom. In some embodiments, $R^{22}$ and $R^{27}$ are independently 3,5-bis(trifluoromethyl)phenyl or 3,5-di-tert-butylphenyl. In other embodiments, $R^{22}$ and $R^{27}$ are independently $(C_1-C_{20})$alkyl.

In one or more embodiments, $R^{23}$ and $R^{26}$ are independently $(C_6-C_{40})$aryl optionally substituted with $R^S$, where $R^S$ is $(C_1-C_{30})$hydrocarbyl, —CF$_3$, or halogen atom. In some embodiments, $R^{23}$ and $R^{26}$ are independently $(C_1-C_{20})$alkyl. In other embodiments, $R^{23}$ and $R^{26}$ are —CF$_3$. In various embodiments, all of $R^{21-28}$ (i.e., $R^{21}$, $R^{22}$, $R^{23}$, $R^{24}$, $R^{25}$, $R^{26}$, $R^{27}$, and $R^{28}$) are —H.

Each $R^C$ in formula (I) is independently a $(C_1-C_{30})$hydrocarbyl, $(C_1-C_{30})$heterohydrocarbyl, or —H; and each $R^S$ in formula (I) is independently $(C_1-C_{20})$hydrocarbyl or halogen.

In the metal-ligand complex according to formula (I), each Y bonds with M through a dative bond or an ionic bond. In one or more embodiments, Y is a Lewis base. The Lewis base may be a compound or an ionic species, provided the compound or ionic species can donate an electron pair to an acceptor moiety. For purposes of this description, the acceptor moiety is M, the metal of the metal-ligand complex of formula (I). In some embodiments, Y is a Lewis base that is a neutral heterohydrocarbon or a hydrocarbon. Examples of neutral heterohydrocarbon Lewis bases include, but are not limited to, amines, trialkylamines, ethers, cycloethers, phosphines, or sulfides. Examples of neutral hydrocarbon Lewis bases include, but are not limited to, alkenes, alkynes, or arenes.

In one or more embodiments, Y is a neutral Lewis basic aprotic $(C_2-C_{40})$heterohydrocarbon. Aprotic $(C_2-C_{40})$heterohydrocarbons are $(C_2-C_{40})$heterohydrocarbons as previously defined, for which every hydrogen atom of the $(C_2-C_{40})$heterohydrocarbon has a pKa of greater than 30 wherein pKa is the negative base-10 logarithm of the acid dissociation constant (Ka). In some embodiments, Y is an organic Lewis base. Examples of organic Lewis bases include pyridine, or a substituted pyridine, a sulfoxide, a trialkyl or triaryl phosphine, a trialkyl or triaryl phosphine oxide, an olefin or cyclic olefin, a substituted or unsubstituted heterocycle, an alkyl ester of an aliphatic or aromatic carboxylic acid, an aliphatic ketone, an aliphatic amine, an alkyl or cycloalkyl ether, or mixtures thereof, each electron donor having 2 to 20 carbon atoms. In various embodiments, the organic Lewis base is selected from alkyl and cycloalkyl ethers having 2 to 20 carbon atoms; and dialkyl, diaryl, and alkylaryl ketones having 3 to 20 carbon atoms; and alkyl esters having 2 to 20 carbon atoms. Specific examples of an organic Lewis base include, but are not limited to: methyl formate, ethyl acetate, butyl acetate, ethyl ether, dioxane, di-n-propyl ether, dibutyl ether, ethyl formate, dimethylformamide, methyl acetate, ethyl anisate, ethylene carbonate, tetrahydropyran, tetrahydrofuran, ethyl propionate, lutidine, picoline, pyridine, dimethyl sulfoxide, trimethylphosphine, triethylphosphine, triphenylphosphine, cyclooctadiene, cyclopentene, ethylene, propylene, tert-butyl ethylene, trimethylamine, triethylamine, tributylamine, N,N-dimethylaniline, 1-methylimidazole, or 1-methylpyrazole.

In one or more embodiments, the Lewis base group Y of formula (I) may be a monodentate ligand that may be a neutral ligand. In some embodiments, the neutral ligand may contain a heteroatom. In specific embodiments, Y is a neutral ligand that is a neutral group such as $R^T NR^K R^L$, $R^K OR^L$, $R^K SR^L$, or $R^T PR^K R^L$, where each $R^T$, $R^K$, and $R^L$ independently are $[(C_1-C_{10})$hydrocarbyl$]_3$Si$(C_1-C_{10})$hydrocarbyl, $(C_1-C_{40})$hydrocarbyl, $[(C_1-C_{10})$hydrocarbyl$]_3$Si, $(C_1-C_{40})$heterohydrocarbyl, or hydrogen.

In some embodiments, the Lewis base group Y of formula (I) is $(C_1-C_{20})$hydrocarbon. In some embodiments, the Lewis base group Y is cyclopentadiene, 1,3-butadiene or cyclooctene.

In various embodiments, the Lewis base group Y of formula (I) is a $(C_1-C_{20})$heterohydrocarbon, wherein the hetero atom of the heterohydrocarbon is oxygen. In some embodiments, Y is tetrahydrofuran, pyrene, dioxane, diethyl ether, or methyl tert-butyl ether (MTBE).

In various embodiments, the Lewis base is a $(C_1-C_{20})$heterohydrocarbon, wherein the heteroatom of the heterohydrocarbon is nitrogen. In some embodiments, Y is pyridine, picoline, lutidine, trimethylamine, or triethylamine.

In various embodiments, the Lewis base is a $(C_1-C_{20})$heterohydrocarbon, wherein the heteroatom of the heterohydrocarbon is phosphorus. In some embodiments, Y is trimethylphosphine, triethylphosphine, triphenylphosphine, triethylphosphite, trimethylphosphite, triphenylphosphite, or triphenylphosphine oxide.

In some embodiments, X and Y are covalently linked. Specific examples of an organic Lewis base Y covalently linked together with an X group include, but are not limited to: 4-cycloocten-1-yl, 2-dimethylaminobenzyl, and 2-dimethylaminomethylphenyl.

In some embodiments, X and Y are linked and selected from the group consisting of:

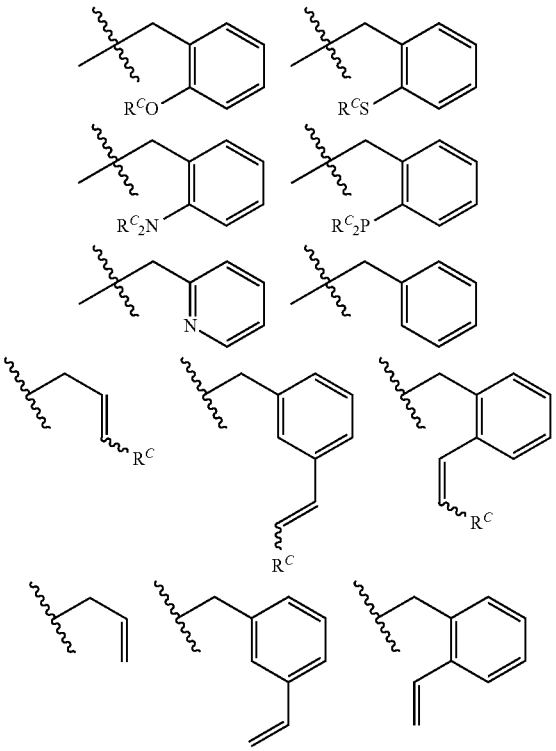

-continued

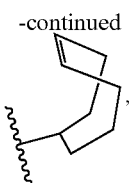

where $R^C$ is —H or $(C_1-C_{30})$hydrocarbyl, $(C_1-C_{30})$heterohydrocarbyl, $(C_1-C_{20})$alkyl, or $(C_1-C_{12})$alkyl.

In the metal-ligand complex according to formula (I), X bonds with M through a covalent bond or an ionic bond. In some embodiments, X may be a monoanionic ligand having a net formal oxidation state of −1. Each monoanionic ligand may independently be hydride, $(C_1-C_{40})$hydrocarbyl carbanion, $(C_1-C_{40})$heterohydrocarbyl carbanion, halide, nitrate, hydrogencarbonate, dihydrogenphosphate, hydrogensulfate, HC(O)O—, HC(O)N(H)⁻, $(C_1-C_{40})$hydrocarbylC(O)O⁻, $(C_1-C_{40})$hydrocarbylC(O)N($(C_1-C_{20})$hydrocarbyl)⁻, $(C_1-C_{40})$hydrocarbylC(O)N(H)⁻, $R^K R^L B^-$, $R^K R^L N^-$, $R^K O^-$, $R^K S^-$, $R^K R^L P^-$, or $R^M R^K R^L Si^-$, where each $R^K$, $R^L$, and $R^M$ independently is hydrogen, $(C_1-C_{40})$hydrocarbyl, or $(C_1-C_{40})$heterohydrocarbyl, or $R^K$ and $R^L$ are taken together to form a $(C_2-C_{40})$hydrocarbylene or $(C_1-C_{20})$heterohydrocarbylene and $R^M$ is as defined above.

In some embodiments, X is a halogen, $(C_1-C_{20})$hydrocarbyl, $(C_1-C_{20})$heterohydrocarbyl, unsubstituted $(C_1-C_{20})$hydrocarbylC(O)O—, or $R^K R^L N$—, wherein each of $R^K$ and $R^L$ independently is an unsubstituted $(C_1-C_{20})$hydrocarbyl. In some embodiments, each monodentate ligand X is a chlorine atom, $(C_1-C_{10})$hydrocarbyl (e.g., $(C_1-C_6)$alkyl or benzyl), unsubstituted $(C_1-C_{10})$hydrocarbylC(O)O—, or $R^K R^L N$—, wherein each of $R^K$ and $R^L$ independently is an unsubstituted $(C_1-C_{10})$hydrocarbyl.

In further embodiments, X is selected from methyl; ethyl; 1-propyl; 2-propyl; 1-butyl; 2,2,-dimethylpropyl; trimethylsilylmethyl; dimethylphenylsilylmethyl; methyldiphenylsilylmethyl; triphenylsilylmethyl; benzyldimethylsilylmethyl; trimethylsilylmnethiyldirnethylsilylrnethyl; phenyl; benzyl; or chloro.

In one or more embodiments, each X is independently —$(CH_2)SiR^X_3$, in which each $R^X$ is independently a $(C_1-C_{30})$alkyl or a $(C_1-C_{30})$heteroalkyl and at least one $R^X$ is $(C_1-C_{30})$alkyl. In some embodiments, when one of $R^X$ is a $(C_1-C_{30})$heteroalkyl, at least one heteroatom is a silicon or oxygen atom. In some embodiments, $R^X$ is methyl, ethyl, propyl, 2-propyl, butyl, 1,1-dimethylethyl (or tert-butyl), pentyl, hexyl, heptyl, n-octyl, tert-octyl, or nonyl.

In one or more embodiments X is —$(CH_2)Si(CH_3)_3$, —$(CH_2)Si(CH_3)_2(C_6H_5)$, —$(CH_2)Si(CH_3)(C_6H_5)_2$, —$(CH_2)Si(C_6H_5)_3$, —$(CH_2)Si(CH_3)_2(CH_2C_6H_5)$, —$(CH_2)Si(CH_3)_2(CH_2CH_3)$, —$(CH_2)Si(CH_3)(CH_2CH_3)_2$, —$(CH_2)Si(CH_2CH_3)_3$, —$(CH_2)Si(CH_3)_2$(n-butyl), —$(CH_2)Si(CH_3)_2$(n-hexyl), —$(CH_2)Si(CH_3)$(n-oct)$R^X$, —$(CH_2)Si(CH_3)_2 R^X$, —$(CH_2)Si$(n-oct)$R^X_2$, —$(CH_2)Si(CH_3)_2$(2-ethylhexyl), —$(CH_2)Si(CH_3)_2$(dodecyl), or —$CH_2Si(CH_3)_2CH_2Si(CH_3)_3$ (herein referred to as —$CH_2Si(CH_3)_2(CH_2TMS)$. Optionally, in some embodiments, in the metal-ligand complex according to formula (I), exactly two $R^X$ are covalently linked or exactly three $R^X$ are covalently linked.

In some embodiments, X is —$CH_2Si(R^C)_{3-Q}(OR^C)_Q$, —$Si(R^C)_{3-Q}(OR^C)_Q$, —$OSi(R^C)_{3-Q}(OR^C)_Q$, in which subscript Q is 0, 1, 2 or 3 and each $R^C$ is independently a substituted or unsubstituted $(C_1-C_{30})$hydrocarbyl, or a substituted or unsubstituted $(C_1-C_{30})$heterohydrocarbyl. In some embodiments, X is —$CH_2Si(CH_3)_3$; in other embodiments, X is —$CH_2Si(CH_3)_2OSi(CH_3)_3$ In some embodiments, any or all of the chemical groups of the procatalysts of formula (I) may be unsubstituted, except for either $R^{11}$ or $R^{15}$. At least one of $R^{11}$ and $R^{15}$ is substituted. In other embodiments, none, any, or all of the chemical groups X and $R^1$-$R^4$, $R^{11-15}$, or $R^{21-28}$ of the metal-ligand complex of formula (I) may be substituted with one or more than one $R^S$. When two or more than two $R^S$ are bonded to a same chemical group of the procatalysts of formula (I), the individual $R^S$ of the chemical group may be bonded to the same carbon atom or heteroatom or to different carbon atoms or heteroatoms. In some embodiments, none, any, or all of the chemical groups X and $R^1$-$R^4$. $R^{11-15}$ or $R^{21-28}$ may be persubstituted with $R^S$. In the chemical groups that are persubstituted with $R^S$, the individual $R^S$ may all be the same or may be independently chosen.

Embodiments of this disclosure include polymerization processes. In some embodiments, the polymerization process includes polymerizing ethylene with one or more olefinic monomers in the presence of a catalyst system under olefin polymerization conditions to form an ethylene-based copolymer, the catalyst system comprising a metal-ligand complex according to formula (I) as described in this disclosure. Olefinic monomers may include, but are not limited to, propylene, 1-butene, 1-hexene, 1-octene, 1-nonene, 1-decene, 1-undecene, 1-dodecene, 4-methyl-1-pentene, styrene, cyclobutene, cyclopentene, norbornene, ethylidene norbornene, alkyl acrylate, glycidyl acrylate, vinyl acetate, $CH_2$=$CHC(O)(OR^X)$, $CH_2$=$CHC(O)R^X$, $CH_2$=$CH(OR^X)$, $CH_2$=$CH(CH_2)(OR^X)$, $CH_2$=$CHSi(R^X)_{3-Y}(OR^X)_Y$, $CH_2$=$CH$—$OSi(R^X)_{3-Y}(OR^X)_Y$, or $CH_2$=$CHCl$, where $R^X$ is chosen from —H, a substituted or unsubstituted $(C_1-C_{30})$hydrocarbyl, or a substituted or unsubstituted $(C_1-C_{30})$heterohydrocarbyl, and subscript Y is 0, 1, 2, or 3.

In one or more embodiments, the polymerization processes include polymerizing ethylene, one or more polar monomers, and optionally, one or more α-olefin monomers in the presence of a catalyst system under olefin polymerization conditions to form an ethylene/polar monomer copolymer, the catalyst system comprising a procatalyst according to formula (I) of this disclosure. In one or more embodiments, the polymerization processes include polymerizing ethylene, one or more alkyl acrylate monomers, and optionally, one or more α-olefin monomers in the presence of a catalyst system under olefin polymerization conditions to form an ethylene/alkyl acrylate copolymer, the catalyst system comprising a procatalyst according to formula (I) of this disclosure.

In one or more embodiments, the polymerization processes include polymerizing ethylene, one or more polar monomers, and optionally, one or more cyclic olefin monomers in the presence of a catalyst system under olefin polymerization conditions to form an ethylene/polar monomer copolymer, the catalyst system comprising a procatalyst according to formula (I) of this disclosure. Cyclic olefin monomers are cyclic compounds containing ethylenic unsaturation in the cyclic part of the molecule. Examples of these include cyclobutene, cyclopentene, norbornene, and norbornene derivatives that are substituted in the 5-position and 6-positions with $(C_1-C_{20})$hydrocarbyl. In one or more embodiments, the polymerization processes include polymerizing ethylene, one or more alkyl acrylate monomers, and optionally, one or more cyclic olefin monomers in the presence of a catalyst system under olefin polymerization conditions to form an ethylene/alkyl acrylate copolymer, the catalyst system comprising a procatalyst according to formula (I) of this disclosure.

In various embodiments of the polymerization processes, the polar comonomer includes alkyl acrylates ($CH_2$=CHC(O)(OR)), glycidyl acrylate, $CH_2$=CH($CH_2$)$_n$C(O)(OR), $CH_2$=CHC(O)R, $CH_2$=CH($CH_2$)$_n$C(O)R, $CH_2$=CH—OC(O)R, $CH_2$=CH($CH_2$)$_n$—OC(O)R, $CH_2$=CH(OR), $CH_2$=CH($CH_2$)$_n$(OR), $CH_2$=CHSi(R)$_{3-T}$(OR)$_T$, $CH_2$=CH($CH_2$)$_n$Si(R)$_{3-T}$(OR)$_1$, $CH_2$=CH—OSi(R)$_{3-T}$(OR)$_T$, $CH_2$=CH($CH_2$)$_n$—OSi(R)$_{3-T}$(OR)$_1$ or $CH_2$=CHCl. Each R is chosen from —H, substituted ($C_1$-$C_{30}$)hydrocarbyl, unsubstituted ($C_1$-$C_{30}$)hydrocarbyl, substituted ($C_1$-$C_{30}$)heterohydrocarbyl, or unsubstituted ($C_1$-$C_{30}$)heterohydrocarbyl. Subscript T is 0, 1, 2, or 3. Subscript n is 1 to 10. In embodiments in which the polar monomer is an alkyl acrylate, substituted ($C_1$-$C_{30}$)hydrocarbyl acrylate, unsubstituted ($C_1$-$C_{30}$)hydrocarbyl acrylate, substituted ($C_1$-$C_{30}$) heterohydrocarbyl acrylate, or unsubstituted ($C_1$-$C_{30}$)heterohydrocarbyl acrylate, the polar ethylene-based copolymer may be de-esterified to form an acrylic acid ethylene-based copolymer.

In some embodiments of the polymerization process, the polar comonomer may be an alkyl acrylate such as, by way of example and not limitation, methyl acrylate, ethyl acrylate, n-butyl acrylate, iso-butyl acrylate, t-butyl acrylate, or combinations thereof. In various embodiments, the alkyl acrylate is a $C_1$-$C_8$-alkyl acrylate, that is, an alkyl ester of acrylic acid, in which the alkyl has from 1 to 8 carbon atoms. In particular embodiments, the polar comonomer is an alkyl acrylate chosen from t-butyl acrylate or n-butyl acrylate.

In some embodiments of the polymerization process the optional α-olefin monomer may be, by way of example and not limitation, propylene, 1-butene, 1-pentene, 1-hexene, 1-heptene, 1-octene, 1-nonene, 1-decene, 1-undecene, 1-dodecene, 4-methyl-1-pentene, styrene, or combinations thereof. In one or more embodiments of the polymerization process, the process may include a cyclic olefin, such as cyclobutene, cyclopentene, norbornene, and norbornene derivatives that are substituted in the 5-position and 6-position with ($C_1$-$C_{20}$)hydrocarbyl.

In illustrative embodiments, the catalyst systems may include a procatalyst according to formula (I) having the structure of the Procatalysts 1 to 6, as listed below:

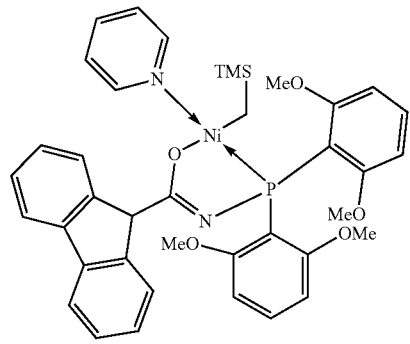

Procatalyst 1

-continued

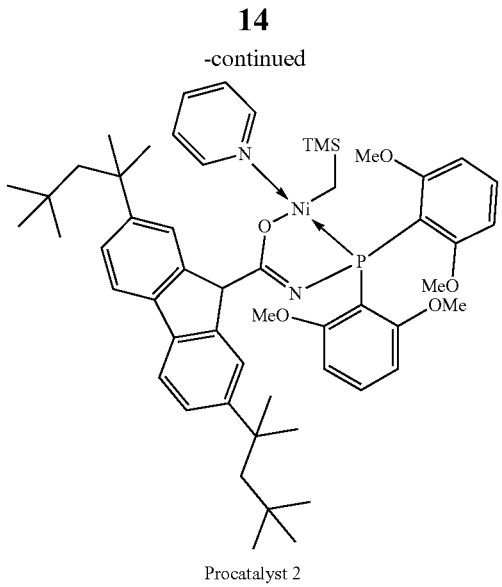

Procatalyst 2

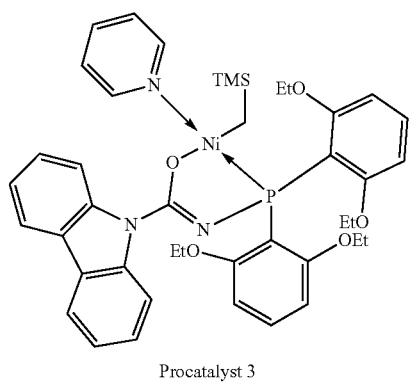

Procatalyst 3

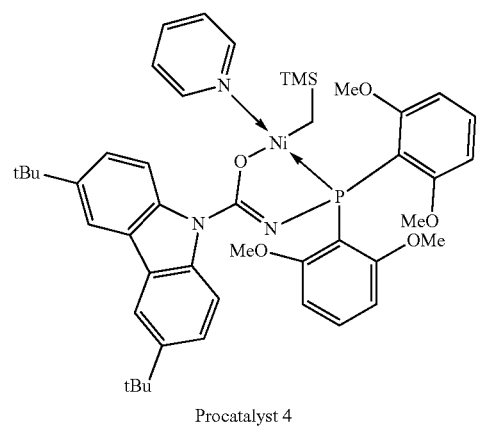

Procatalyst 4

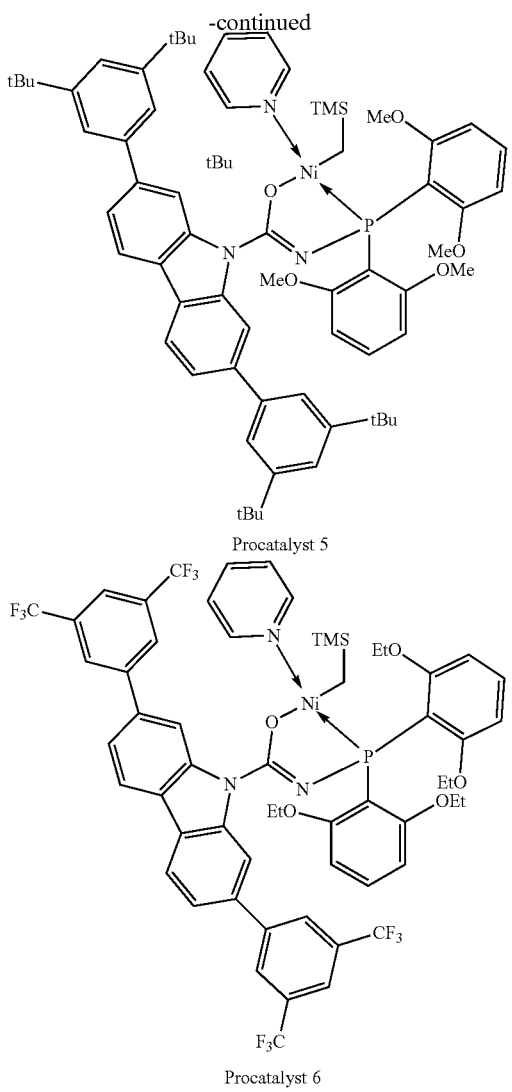

Procatalyst 5

Procatalyst 6 wherein TMS is trimethylsilyl, Me is methyl, Et is ethyl, and tBu is t-butyl.

Ethylene/Acrylate Copolymer

In various embodiments, the polymerization process of this disclosure may produce a polar ethylene-based copolymer, in which the polar ethylene-based copolymer contains at least 50 percent by weight (wt. %) ethylene based on the weight of the polar ethylene-based copolymer. In some embodiments, the polar ethylene-based copolymer is the reaction product of 70 wt. % to 99.9 wt. % ethylene units and 0.1 wt. % to 30 wt. % polar comonomer units based on the sum of the ethylene units and the polar comonomer units.

In one or more embodiments, the polymerization process of this disclosure may include ethylene monomers, alkyl acrylate monomers, and optionally one or more α-olefins. In some embodiments of the polymerization process which includes α-olefins, the α-olefins may be incorporated into the produced polymers in amounts of from 0.01 to 49.9 wt. % based on the weight of the ethylene-based copolymer.

In various embodiments, the polymerization process of this disclosure may produce ethylene-based copolymer with a molecular weight of from 2,000 g/mol to 1,000,000 g/mol. In some embodiments, the produced polymer has a molecular weight of from 25,000 g/mol to 900,000 g/mol, from 30,000 g/mol to 800,000 g/mol, or from 10,000 g/mol to 300,000 g/mol.

General Procedure for PPR Screening Experiments

Polyolefin catalysis screening was performed in a high-throughput parallel polymerization reactor (PPR) system. The PPR system was comprised of an array of 48 single-cell (6×8 matrix) reactors in an inert atmosphere glovebox. Each cell was equipped with a glass insert (reactor tube) with an internal working liquid volume of approximately 5 mL. Each cell had independent controls for pressure and was continuously stirred at 500 Hz. Catalyst, ligand, and metal precursor solutions, and optional activator solutions (if used), unless otherwise noted, were prepared in toluene. Unless otherwise indicated, ligands were metallated with a 1:1 ligand:metal (L:M) ratio by premixing a solution of metal precursor with a solution of the ligand. In many cases, the procatalyst complex resulting from the metallation reactions was isolated and purified prior to introduction to the PPR reactor. All liquids (i.e., solvent, t-butyl acrylate, and catalyst solutions and optional activator solutions (if used)) were added via robotic syringes. Gaseous reagents (i.e., ethylene) were added via a gas injection port. Prior to each run, the reactors were heated to 50° C., purged with ethylene, and vented. Tert-butyl acrylate was filtered through a short column of activated alumina prior to use to remove any polymerization inhibitors (e.g., 4-methoxyphenol).

All desired cells were injected with t-butyl acrylate followed with a portion of toluene. The reactors were heated to the run temperature and then pressured to the appropriate pressure with ethylene. Isolated procatalyst complexes or in situ metallated ligands and optional activator solutions (if used) were then added to the cells. Each catalyst addition was chased with a small amount of toluene so that after the final addition, a total reaction volume of 5 mL was reached. Upon addition of the catalyst, the PPR software began monitoring the pressure of each cell. The desired pressure (within approximately 2-6 psig) was maintained by the supplemental addition of ethylene gas by opening the valve at the set point minus 1 psi and closing it when the pressure reached 2 psi higher. All drops in pressure were cumulatively recorded as "Uptake" or "Conversion" of the ethylene for the duration of the run or until the uptake or conversion requested value was reached, whichever occurred first. Each reaction was then quenched by addition of 10% oxygen in nitrogen for 30 seconds at 40 psi higher than the reactor pressure (the elapsed time from the start of the run to the point the quench is initiated is the "Quench Time'). The shorter the "Quench Time", the more active the catalyst. In order to prevent the formation of too much polymer in any given cell, the reaction was quenched upon reaching a predetermined uptake level of 80 psig. After all the reactors were quenched they were allowed to cool to about 60° C. They were then vented and the reactor tubes were removed and placed in a centrifugal evaporator. The polymer samples were then dried in a centrifugal evaporator at 60° C. for 12 hours, weighed to determine polymer yield and submitted for IR (t-butyl acrylate incorporation), GPC (molecular weight, polydispersity (PDI)), and DSC (melting point) analysis.

General Procedure for Batch Reactor Experiments

Note: Contact with tert-butyl acrylate should be minimized as acrylates are sensitizers, for example, using a lidded dump pot and a well-ventilated fume hood. Caution should be taken when transferring reactor contents to the dump pot and while emptying the dump pot in a fume hood.

Polymerization reactions are conducted in a 2-L Parr batch reactor. The reactor is heated by an electrical heating mantle, and is cooled by an internal serpentine cooling coil containing cooling water. The water was pre-treated by passing through an Evoqua water purification system. Both the reactor and the heating/cooling system are controlled and monitored by a Camile TG process computer. The bottom of the reactor is fitted with a dump valve, which emptied the reactor contents into a lidded dump pot. The dump pot is prefilled with a catalyst kill solution (typically 5 mL of an Irgafos/Irganox/toluene mixture). The lidded dump pot is vented to a 15 gallon blow-down tank, with both the pot and the tank being $N_2$-purged. All chemicals used for polymerization or catalyst makeup were run through purification columns in order to remove any impurities that may affect polymerization. The toluene was passed through two columns, the first containing A2 alumina and the second containing Q5 reactant. The tert-butyl acrylate was filtered through activated alumina. The ethylene was passed through two columns, the first containing A204 alumina and 4 Å molecular sieves and the second containing Q5 reactant. The $N_2$, used for transfers, was passed through a single column containing A204 alumina, 4 Å molecular sieves, and Q5 reactant.

The reactor was loaded first from a shot tank that contained toluene and tert-butyl acrylate. The shot tank was filled to the load set points by use of a differential pressure transducer. After solvent/acrylate addition, the shot tank was rinsed twice with toluene and the rinses were transferred to the reactor. The reactor was then heated to the desired polymerization temperature set point. Upon reaching the temperature set point, ethylene was added to the reactor in order to reach the desired pressure set point. The amount of ethylene added to the reactor is monitored by a micromotion flow meter.

The procatalysts were handled in an inert atmosphere glove box, and introduced to the reactor as solutions in toluene. The procatalyst solution is drawn into a syringe and pressure transferred into the catalyst shot tank. Then, the syringe is rinsed three times with 5 mL of toluene. Procatalyst was only added after the reactor pressure set point was achieved.

Immediately after procatalyst addition, the run timer began. Ethylene was then fed (via Camile control) to the reactor in order to maintain the pressure set point. The ethylene/tert-butyl acrylate copolymerization reactions were run for 75 minutes or until 40 g of ethylene uptake occurred, whichever is shorter. The agitator was then stopped and the bottom dump valve was opened to empty reactor contents to the lidded dump pot. The valves on the lidded dump pot were closed, and the sealed dump pot was disconnected from the reactor and taken to a fume hood. Once in the fume hood, the lid was removed from the dump pot and the contents were poured into trays. The trays were left in the hood for a minimum of 36 hours to allow solvent and tert-butyl acrylate to evaporate. The trays containing the remaining copolymer were then transferred to a vacuum oven, where they were heated to 140° C. under vacuum to remove any residual volatile materials. After the trays cooled to ambient temperature, the copolymers were weighed for yield/efficiencies and submitted for polymer testing if so desired.

GPC Procedure

High temperature GPC analysis is performed using a Dow Robot Assisted Delivery (RAD) system equipped with a Polymer Char infrared detector (IR5) and Agilent PL-gel Mixed A columns. Decane (10 μL) is added to each sample for use as an internal flow marker. Polymers are first diluted in 1,2,4-trichlorobenzene (TCB) stabilized with 300 ppm of butylated hydroxytoluene (BHT) at a concentration of 10 mg polymer/mL of TCB and dissolved by stirring at 160° C. for 120 minutes. Prior to injection into the instrument, the samples are further diluted with BHT-stabilized TCB to a concentration of 3 mg of polymer/mL of TCB. Samples (250 μL) are eluted through one PL-gel 20 μm (50 mm×7.5 mm) guard column followed by two PL-gel 20 μm (300 mm×7.5 mm) Mixed-A columns maintained at 160° C. with TCB stabilized with BHT at a flowrate of 1.0 mL/min. The total run time is 24 minutes. To calibrate for molecular weight (MW), Agilent EasiCal polystyrene standards (PS-1 and PS-2) are diluted with 1.5 mL of TCB stabilized with BHT and dissolved by stirring at 160° C. for 15 minutes. These standards were analyzed to create a $3^{rd}$-order MW calibration curve. Molecular weight units were converted from polystyrene (PS) units to polyethylene (PE) units using a daily Q-factor calculated to be around 0.4 using the average of 5 Dowlex 2045 reference samples.

FT-IR Procedure

The 10 mg/mL samples prepared for GPC analyses were also utilized to quantify tert-butyl acrylate (tBA) incorporation by Fourier transform infrared spectroscopy (FTIR). A Dow robotic preparation station heated and stirred the samples at 160° C. for 60 minutes, then deposited 130-μL portions into stainless wells promoted on a silicon wafer. The TCB was evaporated off at 160° C. under nitrogen purge. IR spectra were collected using a Nexus 6700 FT-IR equipped with a DTGS KBr detector from 4000-400 $cm^{-1}$ utilizing 128 scans with a resolution of 4 $cm^{-1}$. Ratio of tBA (C=O: 1762-1704 $cm^{-1}$) to ethylene ($CH_2$: 736-709 $cm^{-1}$) peak areas were calculated and fit to a linear calibration curve to determine total tBA.

DSC Procedure

Melt temperature (Tm), glass transition temperature (Tg), crystallization temperature (Tc), and Heat of Melt are measured on solid polymer samples by differential scanning calorimetry (DSC Q2000, TA Instruments, Inc.) using a Heat-Cool-Heat temperature profile. Open-pan DSC samples of 3-6 mg of polymer is subjected to the temperature profile below and traces were analyzed individually using TA Universal Analysis software or TA Instruments TRIOS software.

Equilibrate at 175.00° C.
Isothermal for 3 minutes
Ramp 30.00° C./min to 0.00° C.
Ramp 10.00° C./min to 175.00° C.

EXAMPLES

Examples 1 to 17 are synthetic procedures for ligand intermediates and ligands. Examples 18 to 24 are synthetic procedures for isolated procatalysts. In Examples 25 and 26, the results of the polymerization reactions of Procatalysts 1 to 6 are tabulated and discussed. One or more features of the present disclosure are illustrated in view of the examples as follows:

General Procedures

All reactions were performed in a nitrogen-purged glove box unless otherwise noted. All solvents and reagents were obtained from commercial sources and used as received unless otherwise noted. Anhydrous toluene, hexanes, tetrahydrofuran, and diethyl ether were purified via passage through activated alumina and, in some cases, Q-5 reactant. Alumina for solvent purification was activated by passing a stream of nitrogen through the alumina for 8 hours at 300° C. Q-5 reactant was activated by heating at 200° C. under a stream of nitrogen for 4 hours, followed by a stream of 5% hydrogen in nitrogen at 200° C. for 3 hours, and finally flushing with nitrogen gas. Solvents used for experiments performed in a nitrogen-filled glovebox were further dried by storage over activated 4 Å molecular sieves. Glassware for moisture-sensitive reactions was dried in an oven overnight prior to use. HRMS analyses were performed using an Agilent 1290 Infinity LC with a Zorbax Eclipse Plus C18 1.8 μm 2.1×50 mm column coupled with an Agilent 6230 TOF Mass Spectrometer with electrospray ionization. NMR spectra were recorded on Varian 400-MR and VNMRS-500 spectrometers. $^1$H NMR data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for $^1$H NMR data are reported in ppm downfield from tetramethylsilane (TMS, δ scale) using residual protons in the deuterated solvent as references. $^{13}$C NMR data were determined with $^1$H decoupling, and the chemical shifts are reported in ppm versus tetramethylsilane. $^{13}$C NMR spectra of phosphines were complex due to C—P coupling. Chemical shifts for $^{31}$P NMR data are reported in ppm relative to external neat $H_3PO_4$. Deuterated solvents for NMR analyses were purchased from Cambridge Isotope Laboratories and stored over activated 4 Å molecular sieves in a nitrogen-purged glove box. Chlorobis(2,6-dimethoxyphenyl)phosphine, chlorobis(2,6-diethoxyphenyl)phosphine, and bis((trimethylsilyl)methyl)bis(pyridine)nickel(II) were prepared according to literature procedures.

Preparation of Ligands

Example 1—2,7-Bis(3,5-bis(trifluoromethyl)phenyl)-9H-carbazole

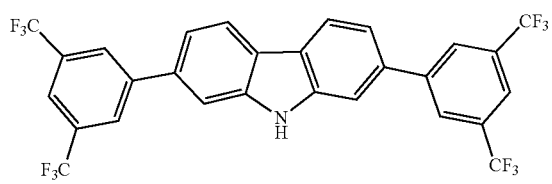 [SMILES: FC(F)(F)c1cc(-c2ccc3c(c2)[nH]c2cc(-c4cc(C(F)(F)F)cc(C(F)(F)F)c4)ccc23)cc(C(F)(F)F)c1]

In a fume hood, a mixture of 2,7-dibromocarbazole (1.06 g, 3.27 mmol), 3,5-bis(trifluoromethyl)phenyl boronic acid (2.53 g, 9.80 mmol), Pd(PPh$_3$)$_4$ (755 mg, 0.65 mmol), and K$_3$PO$_4$ (6.24 g, 29.4 mmol) was added to a 100-mL Schlenk flask. The flask was evacuated under reduced pressure and purged with nitrogen three times. Under a positive nitrogen atmosphere, 30 mL of dioxane and 5 mL of degassed water were added. The flask was equipped with a reflux condenser and was subsequently heated to 100° C. for 72 h. The reaction was cooled and filtered through a silica pad and rinsed with dichloromethane. The filtrate was concentrated onto Celite and the product was purified by column chromatography with 20% dichloromethane/hexane. The product was isolated as white powder. The reaction yielded 1.652 g (2.78 mmol, 85% yield) of the product.

$^1$H NMR (400 MHz, Chloroform-d) δ 8.34 (s, 1H, N—H), 8.25 (d, J=8.1 Hz, 2H), 8.16 (s, 4H), 7.91 (s, 2H), 7.75 (d, J=1.6 Hz, 2H), 7.56 (dd, J=8.1, 1.6 Hz, 2H) ppm. $^{13}$C NMR (101 MHz, Chloroform-d) δ 143.81, 140.67, 136.70, 132.18 (q, J=33.3 Hz), 127.51, 124.80, 123.30, 121.49, 121.23-120.62 (m), 119.50, 109.56 ppm.

Example 2—2,7-Bis(3,5-di-tert-butylphenyl)-9H-carbazole

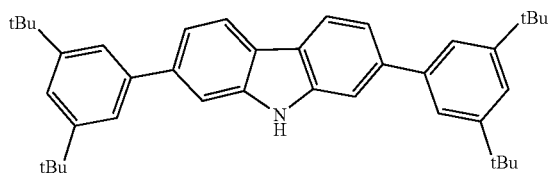 [SMILES: CC(C)(C)c1cc(-c2ccc3c(c2)[nH]c2cc(-c4cc(C(C)(C)C)cc(C(C)(C)C)c4)ccc23)cc(C(C)(C)C)c1]

In a fume hood, a mixture of 2,7-dibromocarbazole (1.06 g, 3.27 mmol), 3,5-di-t-butylphenyl boronic acid (2.30 g, 9.80 mmol), Pd(PPh$_3$)$_4$ (755 mg, 0.65 mmol), and K$_3$PO$_4$ (6.24 g, 29.4 mmol) was added to a 100-mL Schlenk flask. The flask was evacuated under reduced pressure and purged with nitrogen three times. Under a positive nitrogen atmosphere, 30 mL of dioxane and 5 mL of degassed water were added. The flask was equipped with a reflux condenser and was subsequently heated to 100° C. for 24 h. The reaction was cooled and filtered through a silica pad and rinsed with dichloromethane. The filtrate was concentrated onto Celite and the product was purified by column chromatography with hexane/ethyl acetate. The product precipitated from solution during the column purification, and a significant amount of product was lost in the process. The reaction yielded 1.017 g (1.86 mmol, 57% yield) of the product.

$^1$H NMR (400 MHz, Chloroform-d) δ 8.17 (s, 1H), 8.15 (d, J=8.1 Hz, 2H), 7.67 (d, J=1.6 Hz, 2H), 7.57 (d, J=1.8 Hz, 4H), 7.53 (dd, J=8.1, 1.5 Hz, 2H), 7.49 (t, J=1.8 Hz, 2H), 1.45 (s, 36H) ppm. $^{13}$C NMR (101 MHz, Chloroform-d) δ 151.12, 141.35, 140.55 (d, J=5.6 Hz), 122.34, 122.07, 121.29, 120.40, 119.71, 109.34, 35.04, 31.60 ppm.

Example 3—9H-Carbazole-9-carboxamide

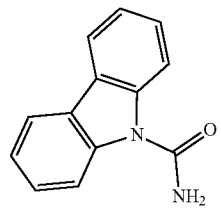 [SMILES: NC(=O)n1c2ccccc2c2ccccc21]

In a glove box, a 250-mL round-bottom Schlenk flask was loaded with 9H-carbazole-9-carbonyl chloride (500 mg, 2.18 mmol), a stir bar, and 30 mL of diethyl ether. The flask was taken out of the box and placed under nitrogen flow on a Schlenk line. While vigorously stirring, a solution of ammonia (2.0 M) in isopropanol was added (16.3 mL, 32.66 mmol) to the contents of the flask. A white precipitate formed immediately and the solution was stirred for 18 h at room temperature. All volatiles were then removed under vacuum, leaving white solids on the walls of the flask. Water (100 mL) was added, and the resultant precipitate was collected by filtration and washed with excess water to remove NH$_4$Cl. A final wash was done with hexane and the resulting white solid was dried under vacuum. The reaction yielded 445 mg (2.11 mmol, 97% yield) of the product.

$^1$H NMR (400 MHz, Chloroform-d) δ 8.15 (d, J=8.4 Hz, 2H), 8.07 (d, J=7.7 Hz, 2H), 7.53 (t, J=7.7 Hz, 2H), 7.40 (t, J=7.5 Hz, 2H), 5.61 (s, 2H) ppm. $^{13}$C NMR (126 MHz, Chloroform-d) δ 178.67, 127.16, 122.73, 120.16, 114.14, 95.81, 95.77 ppm.

Example 4—2,7-Bis(2,4,4-trimethylpentan-2-yl)-9H-carbazole-9-carboxamide

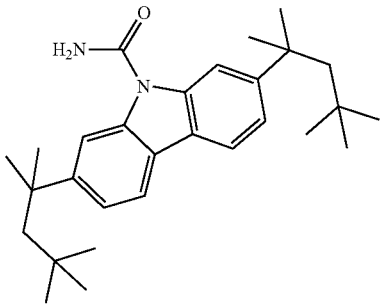 [SMILES: CC(C)(C)CC(C)(C)c1ccc2c3ccc(C(C)(C)CC(C)(C)C)cc3n(C(N)=O)c2c1]

In a glove box, 2,7-bis(2,4,4-trimethylpentan-2-yl)-9H-carbazole (515 mg, 1.31 mmol), a stir bar, and 10 mL of THF was added to a 20-mL vial. The solution was cooled to −35° C. in the glove box freezer. The vial was removed from the freezer and solid NaN(SiMe$_3$)$_2$ (265 mg, 1.45 mmol, 1.1 eq) was added slowly. The reaction mixture was allowed to warm slowly to room temperature while stirring for 1.5 h. To a separate vial, were added 4-nitrophenylchloroformate (268 mg, 1.45 mmol, 1.1 eq), a stir bar, and 3 mL of THF. While stirring, the carbazole-containing solution was added dropwise to the solution containing 4-nitrophenylchloroformate. Once the addition was complete, the solution had turned bright orange with concomitant formation of precipitate. The reaction mixture was stirred for 18 h, and then was taken out of the glove box and quenched with water. The aqueous mixture was extracted with dichloromethane (3×15 mL), and the organic fraction was separated, dried with Mg$_2$SO$_4$, and filtered. All volatiles were removed on the rotary evaporator, leaving behind a light-yellow solid. The solid was washed with hexane and collected by filtration. A total of 501 mg (67%) of precipitate was collected during the filtration and it was confirmed by $^1$H NMR spectroscopy that the major component was the desired product. The crude solids (501 mg, 0.90 mmol, based on 100% purity) were dissolved in DMF (2 mL) and transferred to a 20-mL vial. Ammonium carbonate (32 mg, 30% NH$_3$, 1.85 mmol, 2.0 eq) was added, the vial was sealed, and the mixture was stirred at ambient temperature for 18 h. The cap was carefully removed, and the reaction was quenched with the addition of water (15 mL). A white precipitate formed, and it was collected via filtration. The precipitate was washed with water, and dried under vacuum. The crude reaction mixture was purified by column chromatography. The structure and purity of the compound was confirmed by $^1$H and $^{13}$C NMR spectroscopy. The reaction yielded 213 mg (0.49 mmol, 37% yield over two steps) of the product.

$^1$H NMR (500 MHz, Chloroform-d) δ 8.13 (d, J=1.6 Hz, 2H), 7.87 (d, J=8.2 Hz, 2H), 7.40 (dd, J=8.2, 1.6 Hz, 2H), 5.67 (s, 2H), 1.85 (s, 4H), 1.47 (s, 12H), 0.73 (s, 18H) ppm. $^{13}$C NMR (126 MHz, Chloroform-d) δ 154.05, 149.43, 138.91, 122.97, 121.38, 118.96, 111.69, 57.20, 39.24, 32.43, 32.00, 31.83 ppm.

Example 5—3,6-Di-tert-butyl-9H-carbazole-9-carboxamide

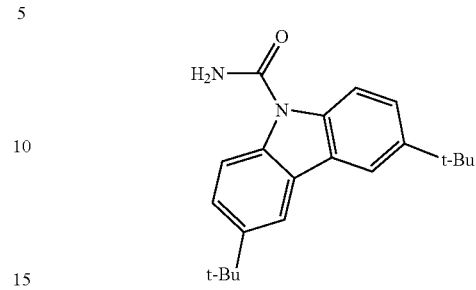

In a glove box, 3,6-di-t-butyl carbazole (735 mg, 2.63 mmol), a stir bar, and 10 mL of THF were added to a 20-mL vial and cooled to −35° C. in a freezer overnight. The vial was removed from the freezer, n-butyllithium (2.0 M, 1.45 mL, 2.89 mmol, 1.1 eq) was added slowly, and the vial was returned to the freezer for 30 min. The vial was then removed from the freezer and the reaction mixture was allowed to stir at room temperature for 1.5 h. 4-Nitrophenylchloroformate (537 mg, 2.89 mmol, 1.1 eq) was added to a 120-mL jar along with a stir bar and 15 mL of THF. While stirring, the lithium carbazole-containing solution was added dropwise to the solution containing 4-nitrophenylchloroformate. Once the addition was complete, the reaction mixture was stirred for 1 h at room temperature. All volatiles were then removed from the solution under vacuum, leaving behind a sticky yellow solid. The $^1$H NMR spectrum was consistent with the carbamate intermediate. DMF (8 mL) was added to the crude reaction mixture and the material was taken outside of the glovebox. In a fume hood, ammonium carbonate (179 mg, 30% NH$_3$, 3.16 mmol) was added to the mixture, the jar was sealed, and the contents were stirred at room temperature for 18 h. The solution was diluted with 100 mL of deionized water and the precipitate that formed was collected by filtration, washed with water several times, and dried under vacuum. The reaction yielded 768 mg (2.39 mmol, 91% yield).

$^1$H NMR (400 MHz, CDCl$_3$) δ 8.18-7.98 (m, 4H), 7.55 (dd, J=8.6, 2.1 Hz, 2H), 5.55 (s, 2H), 1.48 (s, 18H) ppm. $^{13}$C NMR (126 MHz, CDCl$_3$) δ 153.78, 145.82, 136.70, 125.58, 124.70, 116.20, 113.72, 34.74, 31.77 ppm.

Example 6—2,7-Bis(3,5-di-tert-butylphenyl)-9H-carbazole-9-carboxamide

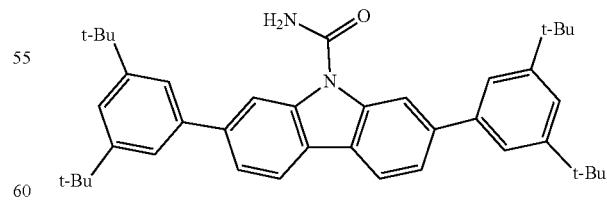

In a glove box, 2,7-bis(3,5-di-tert-butylphenyl)-9H-carbazole (545 mg, 1.00 mmol), a stir bar, and 15 mL of THF were added to a 20-mL vial and cooled in a freezer at −35° C. for 2 h. The vial was removed from the freezer, n-butyllithium (2.0 M, 0.55 mL, 1.10 mmol, 1.1 eq) was added slowly, and the vial was returned to the freezer for 30 min.

The vial was then removed from the freezer and the reaction mixture was allowed to stir at room temperature for 1.5 h. 4-Nitrophenylchloroformate (205 mg, 1.10 mmol, 1.1 eq) was added to a 120-mL jar along with a stir bar and 15 mL of THF. While stirring, the lithium carbazole-containing solution was added dropwise to the solution containing 4-nitrophenylchloroformate. Once the addition was complete, the reaction mixture was stirred at room temperature for 1 h. All volatiles were then removed from the solution under vacuum, leaving behind a sticky yellow solid. The $^1$H NMR spectrum was consistent with the carbamate intermediate. The crude material from the reaction was dissolved in 8 mL of DMF, and the jar containing the material was sealed and taken outside of the glovebox. In a fume hood, ammonium carbonate (67 mg, 30% NH$_3$, 1.20 mmol) was added to the mixture, the jar was sealed, and the contents were stirred at room temperature for 18 h. The solution was diluted with 100 mL of deionized water, and the precipitate that formed was collected by filtration, washed with water several times, and dried under vacuum. The $^1$H NMR spectrum of the precipitate was consistent with the desired product. The reaction yielded 511 mg (0.87 mmol, 87% yield).

$^1$H NMR (400 MHz, Chloroform-d) δ 8.36 (d, J=1.4 Hz, 2H), 8.11 (d, J=8.0 Hz, 2H), 7.64 (dd, J=8.0, 1.5 Hz, 2H), 7.55 (d, J=1.8 Hz, 4H), 7.51 (d, J=1.8 Hz, 2H), 5.69 (s, 2H), 1.45 (s, 36H) ppm. $^{13}$C NMR (101 MHz, Chloroform-d) δ 153.59, 151.29, 141.94, 141.04, 139.34, 124.25, 122.81, 122.11, 121.65, 120.19, 113.12, 35.05, 31.59 ppm.

Example 7—2,7-Bis(3,5-bis(trifluoromethyl)phenyl)-9H-carbazole-9-carboxamide

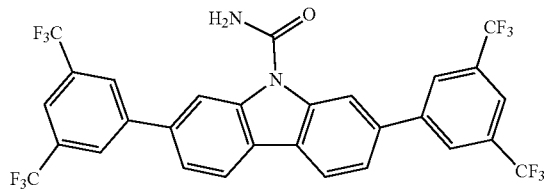 [SMILES: NC(=O)n1c2cc(-c3cc(C(F)(F)F)cc(C(F)(F)F)c3)ccc2c2ccc(-c3cc(C(F)(F)F)cc(C(F)(F)F)c3)cc21]

In a glove box, 2,7-bis(3,5-bis(trifluoromethyl)phenyl)-9H-carbazole (770 mg, 1.30 mmol), a stir bar, and 15 mL of THF were added to a 20-mL vial and cooled in a freezer at −35° C. for 2 h. The vial was removed from the freezer, n-butyllithium (2.0 M, 0.72 mL, 1.43 mmol, 1.1 eq) was added slowly, and the reaction mixture was returned to the freezer for 30 min. The reaction mixture was then removed from the freezer and allowed to stir at room temperature for 1.5 h. 4-Nitrophenylchloroformate (289 mg, 1.43 mmol, 1.1 eq) was added to a 120-mL jar along with a stir bar and 15 mL of THF. While stirring, the lithium carbazole-containing solution was added dropwise to the solution containing 4-nitrophenylchloroformate. Once the addition was complete, the reaction mixture was stirred at room temperature for 1 h. All volatiles were then removed from the solution under vacuum, leaving behind a sticky yellow solid. The $^1$H NMR spectrum was consistent with the carbamate intermediate. DMF (8 mL) was added to the crude reaction mixture and the material was taken outside of the glovebox. In a fume hood, ammonium carbonate (88 mg, 30% NH$_3$, 1.56 mmol) was added to the mixture, the jar was sealed, and the contents were stirred at room temperature for 18 h. The solution was diluted with 100 mL of deionized water and the precipitate that formed was collected by filtration, washed with water several times, and dried under vacuum. The product was recrystallized from hot ethyl acetate, and cooled overnight at 2° C. The product was isolated by filtration as a white powder. The product was isolated and yielded 768 mg (1.21 mmol, 93% yield).

$^1$H NMR (500 MHz, Chloroform-d) δ 8.37 (d, J=1.5 Hz, 2H), 8.20 (d, J=8.1 Hz, 2H), 8.12 (s, 4H), 7.91 (s, 2H), 7.65 (dd, J=8.1, 1.5 Hz, 2H), 5.70 (s, 2H) ppm. $^{19}$F NMR (376 MHz, Chloroform-d) 6-62.75 ppm.

Example 8—N-(Bis(2,6-dimethoxyphenyl)phosphanyl)-9H-carbazole-9-carboxamide

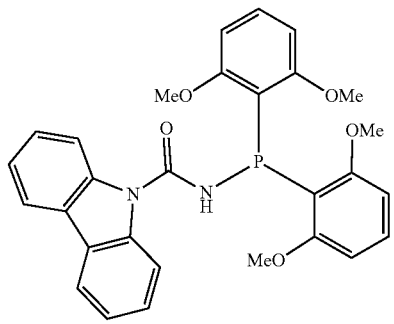 [SMILES: COc1cccc(OC)c1P(NC(=O)n1c2ccccc2c2ccccc21)c1c(OC)cccc1OC]

In a glove box, a 20-mL vial was charged with 9H-carbazole-9-carboxamide (300 mg, 1.43 mmol), 8 mL of THF, and a stir bar. The solution was placed in a freezer at −35° C. for 1.5 h. After removal from the freezer, and while stirring, 2.0 M n-butyllithium (0.79 mL, 1.57 mmol, 1.1 eq) was added dropwise, and the solution was immediately returned to the freezer. After 10 minutes, the reaction mixture was removed from the freezer and a slurry of bis(2,6-dimethoxyphenyl)chlorophosphine (487 mg, 1.43 mmol) in 4 mL THF was added. The reaction mixture was then allowed to warm to room temperature and stir for an hour. After an hour, the reaction was taken to dryness under vacuum and 15 mL of dichloromethane was added. The reaction mixture was filtered through a plug of 50/50 Celite and silica to remove LiCl. All volatiles were removed from the filtrate, and the product was triturated with diethyl ether and collected by filtration. It was confirmed by NMR spectroscopy that the by-products were solely present in the diethyl ether soluble fraction and that the precipitate collected was pure product. The reaction yielded 378 mg (0.73 mmol, 51% yield).

$^1$H NMR (400 MHz, Benzene-d$_6$) δ 8.70 (d, J=5.5 Hz, 2H), 8.35 (dt, J=8.2, 0.9 Hz, 4H), 7.83-7.72 (m, 4H), 7.19-7.13 (m, 4H), 7.12-7.06 (m, 8H), 6.93 (t, J=8.3 Hz, 5H), 6.14 (dd, J=8.3, 2.6 Hz, 8H), 3.12 (s, 20H) ppm. $^{13}$C NMR (126 MHz, Benzene-d$_6$) δ 162.04 (d, J=10.0 Hz), 153.73 (d, J=22.4 Hz), 139.11, 130.25, 126.55, 125.11, 121.74, 119.65, 116.21 (d, J=30.8 Hz), 114.62, 104.53, 55.24 ppm. $^{31}$P NMR (162 MHz, Benzene-d$_6$) δ-1.44 ppm. HRMS (ESI+) (m/z): [M+H] calcd for C$_{29}$H$_{28}$N$_2$O$_5$P: 515.1730; found: 515.1752.

Example 9—N-(Bis(2,6-diethoxyphenyl)phosphanyl)-9H-carbazole-9-carboxamide

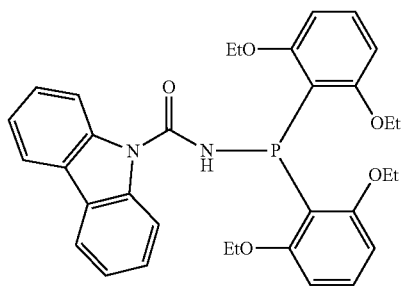 [SMILES: CCOc1cccc(OCC)c1P(NC(=O)n1c2ccccc2c2ccccc21)c1c(OCC)cccc1OCC]

In a glovebox, a glass jar was equipped with a stir bar, 9H-carbazole-9-carboxamide (1.0 g, 4.76 mmol), and dried THF (25 mL). The white slurry was placed in the glovebox freezer at −35° C. for 30 minutes. After 30 minutes, the jar was removed from the freezer and while the contents were stirring, 2.5 M n-butyllithium in hexanes (2.1 mL, 5.25 mmol) was added dropwise. The resulting turbid, yellow solution was placed back in the freezer, and after 10 minutes, the reaction mixture was removed from the freezer and a chilled slurry of bis(2,6-diethoxyphenyl)chlorophosphine (1.982 g, 5.00 mmol) in THF (10 mL) was added. The resulting mixture was stirred for 30 minutes while warming slowly to room temperature. After 30 minutes, an aliquot of the reaction mixture (white slurry) was analyzed by $^{31}$P NMR spectroscopy to check for conversion of the chlorophosphine. According to the $^{31}$P NMR spectrum, the reaction was complete. The reaction mixture was concentrated under vacuum to afford a white solid and dichloromethane (55 mL) was added. The turbid solution was filtered through a plug of Celite and concentrated under vacuum to afford a white solid. The solid was triturated with diethyl ether. The slurry was stirred for 5 minutes at room temperature, and the solid was collected by filtration, washed with diethyl ether, and dried under vacuum. The solid was analyzed by $^{1}$H NMR and $^{31}$P NMR spectroscopy, which revealed the presence of some impurities. The product was purified by column chromatography using a gradient of 0-20% ethyl acetate in hexanes. The fractions from the column were analyzed by HRMS. The fractions containing the product were combined and concentrated by rotary evaporation to afford a white solid. The solid was dried under high vacuum to afford 0.844 g (1.48 mmol, 31% yield) a white solid.

$^{1}$H NMR (400 MHz, Chloroform-d) δ 8.43 (d, J=5.6 Hz, 1H), 8.11 (d, J=8.3 Hz, 2H), 8.00 (d, J=7.7 Hz, 2H), 7.39 (t, J=7.7 Hz, 3H), 7.30 (t, J=7.4 Hz, 2H), 7.18 (t, J=8.3 Hz, 2H), 6.46 (dd, J=8.3, 2.7 Hz, 4H), 4.05-3.54 (m, 8H), 1.01 (t, J=7.0 Hz, 12H) ppm. $^{13}$C NMR (101 MHz, Chloroform-d) δ 161.16 (d, J=9.8 Hz), 153.92 (d, J=24.2 Hz), 138.87, 130.46, 126.66, 125.11, 122.02, 119.85, 115.81 (d, J=25.2 Hz), 114.52, 104.99, 64.38, 14.28 ppm. 31P NMR (162 MHz, Chloroform-d) δ-2.85 ppm.

Example 10—N-(Bis(2,6-dimethoxyphenyl)phosphanyl)-2,7-bis(2,4,4-trimethylpentan-2-yl)-9H-carbazole-9-carboxamide

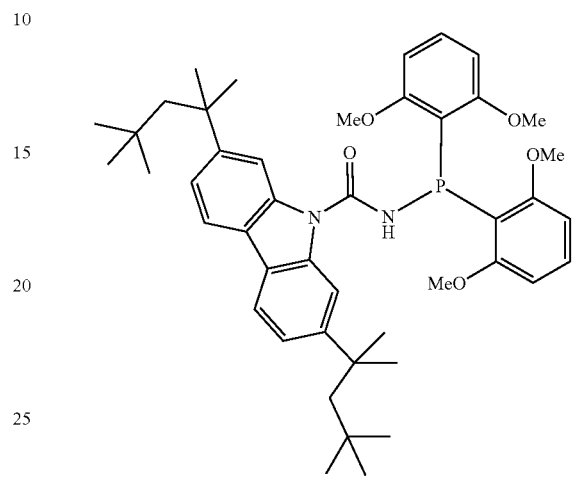

In a glove box, 2,7-bis(2,4,4-trimethylpentan-2-yl)-9H-carbazole-9-carboxamide (213 mg, 0.49 mmol), a stir bar, and 5 mL of THF were added to a 20-mL vial and cooled to −35° C. in a freezer overnight. The solution was removed from the freezer, n-butyllithium (2.0 M, 0.27 mL, 0.54 mmol, 1.1 eq) was added slowly, and the reaction mixture was returned to the freezer for 20 min. The reaction mixture was removed from the freezer and a slurry of chlorobis(2,6-dimethoxyphenyl)phosphine (149 mg, 0.49 mmol) in 3 mL of THF was added. The reaction mixture was allowed to warm to room temperature and stir for an additional hour. All volatiles were then removed under vacuum, and 10 mL of dichloromethane was added to the resultant residue. The dichloromethane solution was filtered through a plug of Celite to remove LiCl. All volatiles were then removed from the filtrate under vacuum, leaving behind a white solid. $^{1}$H and $^{31}$P NMR spectroscopy confirmed that the major component was the desired product. The crude reaction mixture was purified by column chromatography with hexane and ethyl acetate. The reaction yielded 193 mg (0.26 mmol, 53% yield) of the product, isolated as a white powder.

$^{1}$H NMR (400 MHz, Benzene-$d_6$) δ 8.47 (d, J=1.6 Hz, 2H), 8.29 (d, J=6.7 Hz, 1H), 7.85 (d, J=8.2 Hz, 2H), 7.33 (dd, J=8.2, 1.6 Hz, 2H), 7.00 (td, J=8.2, 0.8 Hz, 2H), 6.23 (dd, J=8.3, 2.6 Hz, 4H), 3.17 (s, 12H), 1.76 (s, 4H), 1.33 (s, 12H), 0.75 (s, 18H) ppm. $^{13}$C NMR (126 MHz, Benzene-$d_6$) δ 162.25 (d, J=10.0 Hz), 154.35 (d, J=21.3 Hz), 148.74, 139.72, 130.19, 122.68, 120.68, 118.76, 116.75 (d, J=29.6 Hz), 112.02, 104.90, 56.77, 55.48, 38.95, 32.11, 31.78, 31.68 ppm. $^{31}$P NMR (162 MHz, Benzene-$d_6$) δ-2.71 ppm. HRMS (ESI+) (m/z): [M+H] calcd for $C_{45}H_{60}N_2O_5P$: 739.4239; found: 739.424.

Example 11—N-(Bis(2,6-dimethoxyphenyl)phosphanyl)-3,6-di-tert-butyl-9H-carbazole-9-carboxamide

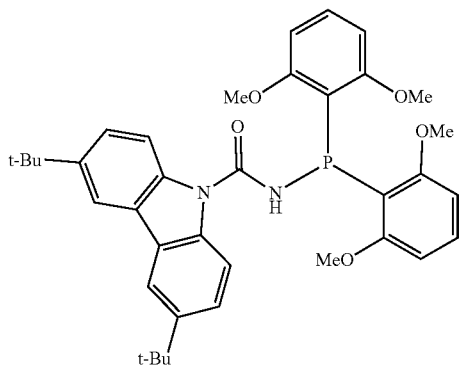 [SMILES: COc1cccc(OC)c1P(NC(=O)n1c2ccc(C(C)(C)C)cc2c2cc(C(C)(C)C)ccc21)c1c(OC)cccc1OC]

In a glove box, a 20-mL vial was charged with 3,6-di-tert-butyl-9H-carbazole-9-carboxamide (50 mg, 0.16 mmol), bis(2,6-dimethoxyphenyl)chlorophosphine (68 mg, 0.20 mmol, 1.28 equiv), 4-pyrrolidinopyridine (37 mg, 0.25 mmol, 1.6 equiv), THF (3 mL), and a stir bar. The solution was heated with stirring at 60° C. for 18 h. The solution was cooled and filtered to remove undesired salts. The filtrate was then concentrated to a volume of about 1 mL under vacuum and hexane (10 mL) was added. A large amount of white precipitate formed and was subsequently collected by filtration, washed with hexane, and dried under vacuum. $^1$H NMR spectroscopy revealed that the white solid was mostly desired product, but there appeared to be some phosphorus oxidation byproducts. The product was purified by column chromatography in 20% ethyl acetate/hexane. The reaction yielded 81 mg (0.13 mmol, 83% yield) of the product, which was isolated as a white powder.

$^1$H NMR (500 MHz, Benzene-$d_6$) δ 8.27 (s, 2H), 8.16 (s, 2H), 7.42 (d, J=8.7 Hz, 2H), 6.96 (tt, J=8.2, 1.5 Hz, 2H), 6.14 (ddd, J=8.3, 3.2, 1.1 Hz, 4H), 2.93 (d, J=1.2 Hz, 12H), 1.36 (s, 18H) ppm. $^{13}$C NMR (101 MHz, Benzene-$d_6$) δ 151.51, 151.36, 138.00, 129.31, 128.51, 125.61, 122.94, 122.33, 111.21 (d, J=13.9 Hz), 109.36 (d, J=3.1 Hz), 46.45, 35.20, 31.80 (d, J=1.6 Hz), 21.63 ppm. $^{31}$P NMR (202 MHz, Benzene-$d_6$) δ-1.75 ppm. HRMS (ESI+) (m/z): [M+H] calcd for $C_{37}H_{44}N_2O_5P$: 627.2987; found: 627.291.

Example 12—N-(Bis(2,6-dimethoxyphenyl)phosphanyl)-2,7-bis(3,5-di-tert-butylphenyl)-9H-carbazole-9-carboxamide

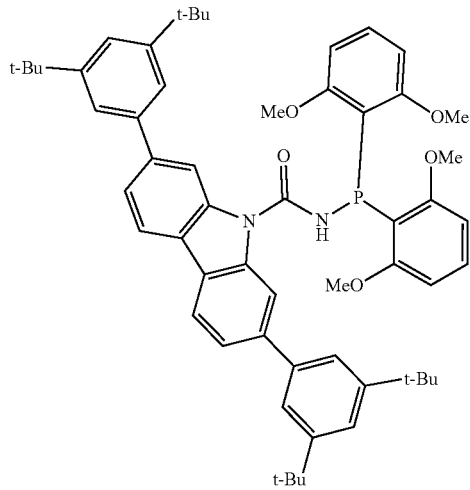 [SMILES: COc1cccc(OC)c1P(NC(=O)n1c2cc(-c3cc(C(C)(C)C)cc(C(C)(C)C)c3)ccc2c2ccc(-c3cc(C(C)(C)C)cc(C(C)(C)C)c3)cc21)c1c(OC)cccc1OC]

In a glove box, 2,7-bis(3,5-di-tert-butylphenyl)-9H-carbazole-9-carboxamide (287 mg, 0.49 mmol), a stir bar, and 5 mL of THF were added to a 20-mL vial and cooled to −35° C. in a freezer overnight. The vial was removed from the freezer, n-butyllithium (2.0 M, 0.27 mL, 0.54 mmol, 1.1 eq) was added slowly, and the reaction mixture was returned to the freezer for 15 min. The reaction mixture was removed from the freezer, and a slurry of chlorobis(2,6-dimethoxyphenyl)phosphine (170 mg, 0.50 mmol) in 3 mL of THF was added. The reaction mixture was allowed to warm to room temperature and stir for an additional hour. All volatiles were then removed under vacuum and 10 mL of dichloromethane was added to the resultant residue. The dichloromethane solution was filtered through a plug of Celite to remove LiCl, but in this case the filtrate was still turbid. The filtrate solution was pushed through a 4-μm syringe filter, and the resulting solution was clear. The reaction was concentrated to a volume of ~2 mL under vacuum and the product was triturated with hexane to give an off-white solid. The product was collected by filtration and dried under vacuum. A total of 87 mg of material was isolated during the filtration and confirmed to be the desired product by $^1$H and $^{31}$P NMR spectroscopy. All volatiles were removed from the filtrate and the resultant crude solids were dissolved in a minimal amount of hexane. The hexane solution was placed in the freezer at −35° C. overnight. The next day, a white powder had precipitated and it was quickly collected by filtration and dried. The second crop of powder was also confirmed to be the desired product (98 mg) by NMR spectroscopy. Yield: 185 mg (two crops, 0.21 mmol, 42% yield) the product was isolated.

$^1$H NMR (400 MHz, Benzene-$d_6$) δ 8.93 (d, J=5.5 Hz, 1H), 8.90 (d, J=1.4 Hz, 2H), 8.01 (d, J=8.0 Hz, 2H), 7.71 (dd, J=8.0, 1.5 Hz, 2H), 7.66 (d, J=1.8 Hz, 4H), 7.55 (t, J=1.8 Hz, 2H), 6.89 (td, J=8.2, 0.8 Hz, 2H), 6.08 (dd, J=8.3, 2.6 Hz, 4H), 3.07 (s, 12H), 1.32 (s, 36H) ppm. $^{13}$C NMR (101 MHz, Benzene-$d_6$) δ 162.03 (d, J=10.1 Hz), 151.09, 142.10 (d, J=23.6 Hz), 140.28, 130.22, 124.12, 122.40, 122.25, 120.95, 119.96, 116.19 (d, J=30.2 Hz), 114.01, 104.57, 55.19, 34.71, 31.36, 25.27, 20.51 ppm. $^{31}$P NMR (162 MHz, Benzene-d$_6$) δ-1.35 ppm. HRMS (ESI+) (m/z): [M+H] calcd for C$_{57}$H$_{68}$N$_2$O$_5$P: 891.486; found: 891.481.

Example 13—N-(Bis(2,6-diethoxyphenyl)phosphanyl)-2,7-bis(3,5-bis(trifluoromethyl)phenyl)-9H-carbazole-9-carboxamide

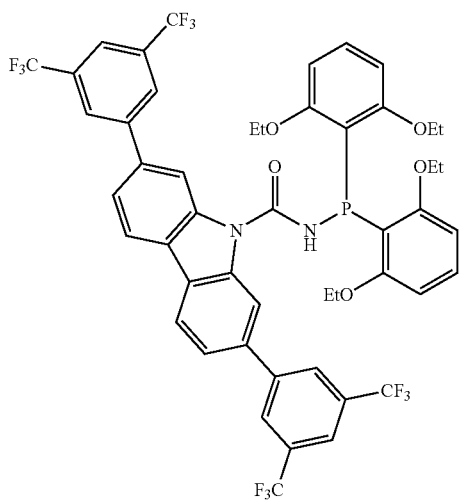 [SMILES: CCOc1cccc(OCC)c1P(NC(=O)n1c2cc(-c3cc(C(F)(F)F)cc(C(F)(F)F)c3)ccc2c2ccc(-c3cc(C(F)(F)F)cc(C(F)(F)F)c3)cc21)c1c(OCC)cccc1OCC]

In a glove box, 2,7-bis(3,5-bis(trifluoromethyl)phenyl)-9H-carbazole-9-carboxamide (187 mg, 0.30 mmol), a stir bar, and 5 mL of THF were added to a 20-mL vial and cooled to −35° C. in a freezer overnight. The reaction mixture was taken out of the freezer, n-butyllithium (2.0 M, 0.16 mL, 0.32 mmol, 1.1 eq) was added slowly, and the reaction mixture was returned to the freezer for 15 min. The reaction mixture was removed from the freezer and a slurry of chlorobis(2,6-diethoxyphenyl)phosphine (123 mg, 0.31 mmol, 1.05 eq) in 3 mL of THF was added. The reaction was allowed to warm to room temperature and stir for an additional hour. All volatiles were then removed under vacuum and 10 mL of dichloromethane was added to the resultant residue. The dichloromethane solution was filtered through a plug of Celite to remove LiCl. The filtrate was concentrated under vacuum to a volume of 2 mL and the resultant residue was triturated with hexane to give a white solid. The product was collected by filtration and dried under vacuum. The product was further purified by column chromatography (20% ethyl acetate/hexane). The reaction yielded 44 mg (0.05 mmol, 18% yield) of the product, which was isolated as a white powder.

$^1$H NMR (500 MHz, Benzene-d$_6$) δ 8.59 (d, J=5.2 Hz, 2H), 8.43 (s, 2H), 7.83 (d, J=8.0 Hz, 2H), 7.79 (s, 4H), 7.73 (s, 2H), 7.07 (dd, J=8.0, 1.6 Hz, 2H), 6.97 (t, J=8.2 Hz, 2H), 6.08 (dd, J=8.4, 2.7 Hz, 4H), 3.54-3.01 (m, 8H), 0.70 (t, J=7.0 Hz, 11H) ppm. $^{31}$P NMR (202 MHz, Benzene-d$_6$) δ-1.57 ppm.

Example 14—N-(Bis(2,6-dimethoxyphenyl)phosphanyl)-3,5-dimethyl-1H-pyrazole-1-carboxamide

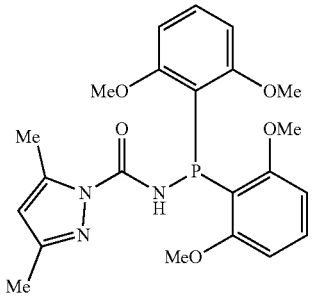 [SMILES: COc1cccc(OC)c1P(NC(=O)n1nc(C)cc1C)c1c(OC)cccc1OC]

In a glove box, 3,5-dimethyl-1H-pyrazole-1-carboxamide (460 mg, 3.13 mmol), a stir bar, and 12 mL of THF were added to a 60-mL jar and cooled to −35° C. in a freezer overnight. The solution was removed from the freezer and n-butyllithium (2.0 M, 1.82 mL, 3.64 mmol, 1.1 eq) was added slowly. The reaction mixture was returned to the freezer for 15 min. A suspension of chlorobis(2,6-dimethoxyphenyl)phosphine (1.183 g, 3.47 mmol) in 8 mL of THF was then added to the cold reaction mixture. The mixture was allowed to warm slowly to room temperature while stirring for 2 h. A large amount of precipitate formed during this time and was collected by filtration. The solid was washed with a small amount of THF to remove LiCl, further washed with hexane, and then dried under vacuum. The isolated white powder was found to be mostly desired product (95% pure) with a small amount of oxidized phosphine present (~5%). All volatiles were removed from the filtrate under vacuum and diethyl ether was added, resulting in precipitation of additional product. The precipitate was collected by filtration, washed with excess diethyl ether, and dried. The second batch of powder was >98% pure by $^{31}$P NMR spectroscopy and combined with the first batch of powder to yield a combined mass of 983 mg (2.10 mmol, 67% yield).

$^1$H NMR (400 MHz, Chloroform-d) δ 10.02 (d, J=5.9 Hz, 1H), 7.21 (t, J=8.3 Hz, 2H), 6.50 (dd, J=8.4, 2.7 Hz, 4H), 5.89 (s, 1H), 3.80 (s, 12H), 2.58 (s, 3H), 2.26 (s, 3H) ppm. $^{13}$C NMR (101 MHz, Chloroform-d) δ 161.97 (d, J=9.8 Hz), 149.18, 143.54, 130.50, 115.19 (d, J=25.6 Hz), 109.24, 104.32, 55.92, 25.62, 14.19, 13.78 ppm. $^{31}$P NMR (162 MHz, Chloroform-d) δ-4.46 ppm.

Example 15—N-(Bis(2,6-dimethoxyphenyl)phosphanyl)-5H-dibenzo[b,f]azepine-5-carboxamide

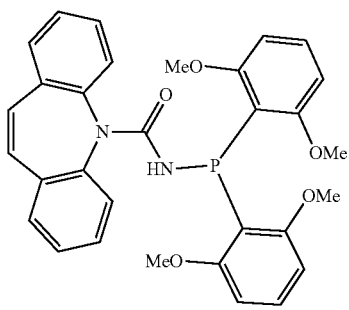 [SMILES: COc1cccc(OC)c1P(NC(=O)N1c2ccccc2C=Cc2ccccc21)c1c(OC)cccc1OC]

In a glove box, a 20-mL vial was charged with 9H-carbazole-9-carboxamide (104 mg, 0.44 mmol), THF (5 mL), and a stir bar. The resulting solution was cooled to −35 C in the freezer for 2 h. The solution was removed from the freezer, and while stirring, n-butyllithium (272 µL, 0.54 mmol) was added dropwise. The reaction mixture was returned to the freezer for 2 h. After removal of the reaction mixture from the freezer, bis(2,6-(dimethoxyphenyl)chlorophosphine (185 mg, 0.54 mmol) was added as a solid to the cold solution. The solution warmed slowly to room temperature while stirring for 18 h. A large amount of white precipitate formed during this time and was collected by filtration, washed with hexane, and dried under vacuum. The $^1$H NMR spectrum indicated that the THF-insoluble material was the desired product. The LiCl was presumably rinsed into the filtrate. Yield: 152 mg (0.25 mmol, 57% yield) of the product was isolated.

$^1$H NMR (500 MHz, Chloroform-d) δ 7.43 (dd, J=8.0, 1.3 Hz, 2H), 7.36 (ddd, J=7.9, 7.0, 1.7 Hz, 2H), 7.31 (dd, J=7.7, 1.8 Hz, 2H), 7.27 (ddd, J=7.7, 4.8, 2.2 Hz, 3H), 7.12 (t, J=8.2 Hz, 2H), 6.39 (dd, J=8.3, 2.6 Hz, 4H), 3.71 (d, J=12.8 Hz, 1H), 3.55 (s, 12H) ppm. 13C NMR (126 MHz, Benzene-d$_6$) δ 161.61 (d, J=9.6 Hz), 156.28 (d, J=21.6 Hz), 141.01, 135.02, 132.01, 130.96, 130.45 (d, J=17.6 Hz), 129.91, 129.03, 128.89, 126.82, 104.14, 55.74 ppm. $^{31}$P NMR (202 MHz, Chloroform-d) δ-3.89 ppm. HRMS (ESI+) (m/z): [M+H] calcd for C$_{31}$H$_{30}$N$_2$O$_5$P: 541.189; found: 541.179.

Example 16—N-(Bis(4-(trifluoromethyl)phenyl)phosphanyl)-9H-carbazole-9-carboxamide

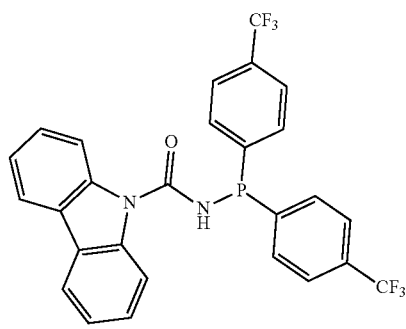 [SMILES: O=C(NP(c1ccc(C(F)(F)F)cc1)c1ccc(C(F)(F)F)cc1)n1c2ccccc2c2ccccc21]

In a glove box, a 20-mL vial was charged with 9H-carbazole-9-carboxamide (173 mg, 0.825 mmol), a stir bar, and THF (8 mL). The solution was placed in the freezer (−35° C.) for 2 h to chill. The solution was removed from the freezer and n-butyllithium (2.0M, 0.45 mL, 0.91 mmol, 1.1 equiv) was added slowly with stirring. The reaction mixture was returned to the freezer for 15 min. Upon removal from the freezer, a solution of bis(4-trifluoromethylphenyl)chlorophosphine (281 mg, 0.82 mmol, 1 equiv) in 3 mL of THF was added slowly. The solution was allowed to warm to room temperature and stir for 2 h. All volatiles were then removed under vacuum, and the resultant crude solids were dissolved in dichloromethane and filtered through a Celite plug to remove LiCl. The filtrate was concentrated under vacuum to a volume of approx. 2 mL and the product was triturated with hexane. The resultant white precipitate was collected by filtration and dried under vacuum. $^1$H NMR spectroscopy revealed that the white solid was the desired product. Yield: 355 mg (0.67 mmol, 81% yield) of the product was isolated.

$^1$H NMR (400 MHz, Chloroform-d) δ 8.14-8.00 (m, 4H), 7.93 (d, J=8.2 Hz, 2H), 7.77-7.67 (m, 8H), 7.55-7.35 (m, 8H), 7.26-7.21 (m, 1H), 6.33 (d, J=3.0 Hz, 1H) ppm. 13C NMR (101 MHz, Chloroform-d) δ 153.50-152.84 (m), 141.43 (d, J=17.1 Hz), 139.49, 138.23, 132.13 (d, J=22.2 Hz), 127.37, 126.55-125.38 (m), 123.30 (d, J=14.4 Hz), 120.40 (d, J=12.2 Hz), 119.45, 113.78, 110.57 ppm. $^{19}$F NMR (376 MHz, Chloroform-d) 8-63.01 ppm. $^{31}$P NMR (162 MHz, Chloroform-d) δ 26.70 ppm. HRMS (ESI+) (m/z): [M+H] calcd for C$_{27}$H$_{18}$F$_6$N$_2$OP: 531.1055; found: 531.109.

Example 17—3-(Bis(2,6-dimethoxyphenyl)phosphanyl)-1,1-dimethylurea

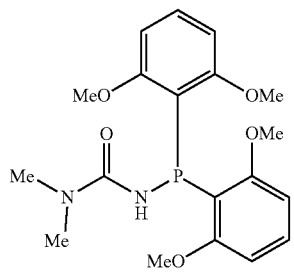 [SMILES: COc1cccc(OC)c1P(NC(=O)N(C)C)c1c(OC)cccc1OC]

In a glovebox, a glass jar equipped with a stir bar was charged with 1,1-dimethylurea (0.500 g, 5.67 mmol) and chilled, dried THF (30 mL). Not all of the starting material dissolved into solution. The reaction mixture was placed in glovebox freezer at −35° C. for 30 minutes. After 30 minutes, it was removed from the freezer and while stirring n-BuLi in hexanes (2.5 M, 2.50 mL, 6.25 mmol) was added dropwise, and the resulting white cloudy solution was placed back in the freezer (−35° C.). The reaction mixture remained at −35° C. for three hours, but was removed periodically to stir. After three hours, the reaction mixture was removed from the freezer, and a chilled suspension of bis(2,6-dimethoxyphenyl)chlorophosphine (2.03 g, 5.96 mmol) in dried THF (10 mL) was added. The resulting light-yellow solution was stirred for one hour while slowly warming to room temperature. After one hour, analysis of an aliquot of the reaction mixture (resulting light yellow slurry) by $^{31}$P NMR spectroscopy showed the reaction was complete. The reaction mixture was concentrated under vacuum to afford a light-yellow sticky solid, and dichloromethane (45 mL) was added. The murky solution was filtered through a plug of Celite, and concentrated under vacuum to afford an off-white crystalline solid. The solid was triturated with diethyl ether. The slurry was stirred for five minutes at room temperature, and the solid was collected by filtration and washed with diethyl ether. The solid was dried under vacuum to afford 1.059 g (2.72 mmol, 48% yield) of the desired product as a white solid. There was evidence of minor oxidation byproducts in the $^{31}$P NMR spectra.

$^1$H NMR (400 MHz, CDCl$_3$) δ 7.52 (d, J=6.0 Hz, 1H), 7.15 (t, J=8.3 Hz, 2H), 6.47 (dt, J=8.4, 4.4 Hz, 5H), 3.71 (s, 12H), 2.92 (s, 6H) ppm. $^{13}$C NMR (101 MHz, CDCl$_3$) δ 161.83, 131.09, 130.33 (d, J=3.7 Hz), 116.59 (d, J=26.5 Hz), 104.88-104.66 (m), 104.19, 56.12, 36.42 ppm. $^{31}$P NMR (162 MHz, CDCl$_3$) δ-2.82 ppm.

Preparation of Ni-Complexes

Example 18—Synthesis of Procatalyst 1 ((Z)—N-(Bis(2,6-dimethoxyphenyl)phosphanyl)-9H-carbazole-9-carbimidate)(pyridine)(trimethylsilylmethyl)nickel(II)

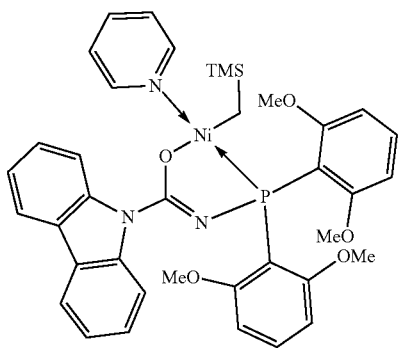

In a glove box, a 20-mL vial was charged with bis(trimethylsilylmethyl)bis(pyridine)nickel (86 mg, 0.22 mmol, 1.0 eq), a stir bar, and 2 mL of toluene. A solution of N-(bis(2,6-dimethoxyphenyl)phosphanyl)-9H-carbazole-9-carboxamide (113 mg, 0.22 mmol,) in 8 mL of toluene was then added slowly with stirring. The solution was orange and clear. The solution was heated slowly to 45° C. and stirred for 1 h. All volatiles were then removed under vacuum. Hexane (3 mL) was added and removed subsequently under vacuum, leaving behind an orange, sticky solid. The product was suspended in hexane and stirred for 15 min. The product was then collected by filtration and dried under vacuum. Yield: 147 mg (0.20 mmol, 89% yield) of the product was isolated.

$^1$H NMR (400 MHz, Benzene-d$_6$) δ 9.11-8.89 (m, 4H), 7.92 (dd, J=7.8, 1.4 Hz, 2H), 7.30 (ddd, J=8.5, 7.2, 1.4 Hz, 2H), 7.25-7.05 (m, 4H+CDCl$_3$), 6.97-6.83 (m, 1H), 6.67-6.53 (m, 2H), 6.37 (dd, J=8.3, 3.7 Hz, 4H), 3.40 (s, 12H), −0.12 (s, 9H), −0.38 (d, J=8.9 Hz, 2H) ppm. $^{13}$C NMR (126 MHz, Benzene-d$_6$) δ 167.07 (d, J=14.5 Hz), 161.47 (d, J=2.1 Hz), 151.02, 140.77, 136.30, 130.31, 125.61, 125.11, 123.38 (d, J=1.8 Hz), 120.75, 118.91, 117.78, 114.39 (d, J=58.8 Hz), 104.79 (d, J=4.4 Hz), 55.47, 1.93, −16.02 (d, J=28.9 Hz) ppm. $^{31}$P NMR (202 MHz, Benzene-d$_6$) δ 46.84 ppm.

Example 19—Synthesis of Procatalyst 2 ((Z)—N-(Bis(2,6-dimethoxyphenyl)phosphanyl)-2,7-bis(2,4,4-trimethylpentan-2-yl)-9H-carbazole-9-carbimidate)(trimethylsilylmethyl)(pyridine)nickel(II)

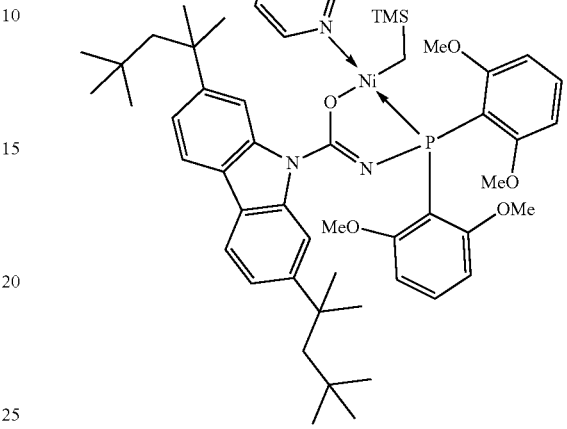

In a glove box, a 20-mL vial was charged with bis(trimethylsilylmethyl)bis(pyridine)nickel (56 mg, 0.14 mmol, 1.05 eq), a stir bar and 1 mL of toluene. A solution of N-(bis(2,6-dimethoxyphenyl)phosphanyl)-2,7-bis(2,4,4-trimethylpentan-2-yl)-9H-carbazole-9-carboxamide (100 mg, 0.14 mmol) in 3 mL of toluene was then added slowly with stirring. The solution was orange and clear. The reaction mixture was stirred for 1 h at 60° C. $^{31}$P NMR spectroscopic analysis of an aliquot of the reaction mixture showed complete conversion to the desired complex. The reaction mixture was then cooled and all volatiles were removed under vacuum. The resultant crude material was dissolved in a minimal amount of hexane and placed in the freezer at −35° C. overnight. The desired product precipitated out of solution during this time. The orange precipitate was collected by filtration and dried under vacuum. The isolated orange solid was confirmed to be the desired product by NMR spectroscopy. The reaction yielded 71 mg (0.08 mmol, 54% yield) of the product.

$^1$H NMR (400 MHz, Benzene-d$_6$) δ 9.12 (dd, J=4.7, 1.7 Hz, 2H), 9.01 (s, 2H), 7.88 (d, J=8.1 Hz, 2H), 7.28 (dd, J=8.2, 1.7 Hz, 2H), 7.15-7.10 (m, 2H+CDCl$_3$), 6.98 (tt, J=7.6, 1.7 Hz, 2H), 6.79-6.63 (m, 2H), 6.38 (dd, J=8.3, 3.7 Hz, 4H), 3.41 (s, 12H), 1.72 (s, 4H), 1.33 (s, 12H), 0.72 (s, 18H), −0.16 (s, 9H), −0.40 (d, J=8.8 Hz, 2H) ppm. $^{13}$C NMR (126 MHz, Benzene-d$_6$) δ 167.59 (d, J=14.2 Hz), 161.39 (d, J=1.8 Hz), 150.93, 146.80, 141.29, 136.04, 130.18, 124.00 (d, J=1.8 Hz), 122.70, 119.33, 117.81, 115.50, 114.40 (d, J=59.3 Hz), 104.54 (d, J=4.3 Hz), 57.13, 55.41, 38.90, 32.14, 32.12, 31.69, 1.82, −16.46 (d, J=29.5 Hz) ppm. $^{31}$P NMR (162 MHz, Benzene-d$_6$) δ 47.27 ppm.

Example 20—Synthesis of Procatalyst 6 ((Z)—N-(Bis(2,6-diethoxyphenyl)phosphanyl)-2,7-bis(3,5-bis(trifluoromethyl)phenyl)-9H-carbazole-9-carbimidate)(pyridine)(trimethylsilylmethyl)nickel(II)

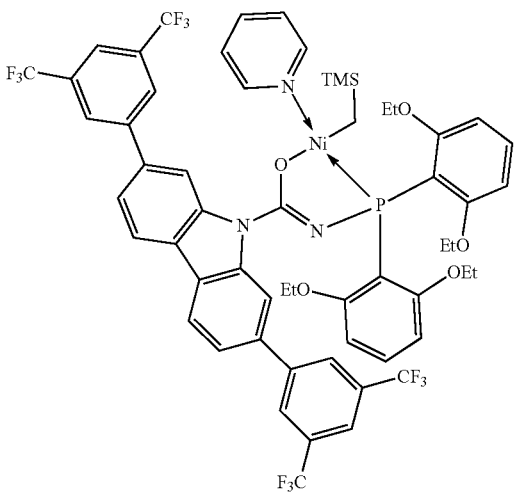

In a glove box, a 20-mL vial was charged with bis(trimethylsilylmethyl)bis(pyridine)nickel (39 mg, 0.10 mmol, 1.0 eq), a stir bar, and 1 mL of toluene. Pyridine (8 µL, 0.10 mmol, 1.0 eq) was then added, followed by a solution of N-(bis(2,6-diethoxyphenyl)phosphanyl)-2,7-bis(3,5-bis(trifluoromethyl)phenyl)-9H-carbazole-9-carboxamide (100 mg, 0.10 mmol) in 3 mL of toluene. The resulting solution was orange and clear, and was stirred for 1 h at 45° C. $^{31}$P NMR spectroscopic analysis of an aliquot of the reaction mixture showed complete conversion of the free ligand to the desired nickel complex. The mixture was filtered through a pad of Celite and all volatiles were removed from the filtrate under vacuum. Hexane (5 mL) was added to the resultant residue and then removed under vacuum, leaving behind a bright-yellow, sticky solid. The product was triturated with hexane and allowed to stir for 15 min. The product was collected by filtration, rinsed with pentane, and dried under vacuum. The reaction yielded 60 mg (0.07 mmol, 71% yield) of the product.

$^1$H NMR (500 MHz, C$_6$D$_6$) δ 10.49-8.19 (m, 4H), 7.90 (d, J=8.0 Hz, 2H), 7.78 (d, J=16.4 Hz, 5H), 7.17-7.10 (m, 6H), 7.08 (d, J=7.8 Hz, 3H), 6.84 (t, J=7.7 Hz, 1H), 6.45 (t, J=6.6 Hz, 2H), 6.38-6.32 (m, 4H), 3.70 (s, 8H), 0.92 (s, 12H), −0.15-−0.38 (m, 11H) ppm. $^{13}$C NMR (126 MHz, C$_6$D$_6$) δ 163.48 (d, J=14.5 Hz), 158.14, 148.21, 142.95, 139.15, 134.09, 133.88, 129.08 (q, J=32.9 Hz), 127.94, 122.29, 121.95, 120.87, 120.12, 118.21, 117.81-117.30 (m), 114.30, 111.27, 110.80, 102.18, 61.09, 11.65, −0.66, −18.76 (d, J=28.9 Hz) ppm. $^{31}$P NMR (202 MHz, C$_6$D$_6$) δ 43.96 ppm. $^{19}$F NMR (376 MHz, C$_6$D$_6$) δ -62.23 ppm.

Example 21—Synthesis of Procatalyst 4 ((Z)—N-(Bis(2,6-dimethoxyphenyl)phosphanyl)-3,6-di-tert-butyl-9H-carbazole-9-carbimidate)(trimethylsilylmethyl)(pyridine)nickel(II)

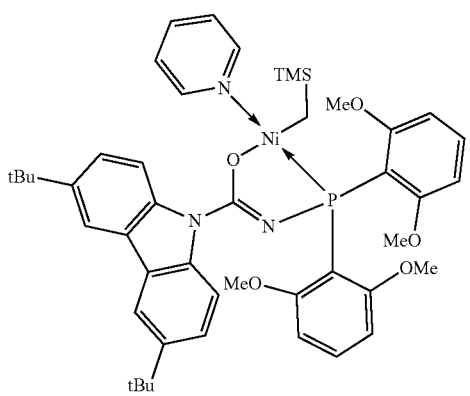

In a glove box, a 20-mL vial was charged with bis(trimethylsilylmethyl)bis(pyridine)nickel (66 mg, 0.17 mmol, 1.05 eq), a stir bar, and 1 mL of toluene. A solution of N-(bis(2,6-dimethoxyphenyl)phosphanyl)-3,6-di-tert-butyl-9H-carbazole-9-carboxamide (100 mg, 0.16 mmol) in 5 mL of toluene was added slowly with stirring. The solution was red and clear. The reaction mixture was stirred for 2 h at room temperature, and $^{31}$P NMR spectroscopic analysis of an aliquot showed complete conversion of the free ligand to the desired nickel complex. The reaction mixture was filtered through a pad of Celite and all volatiles were removed from the filtrate under vacuum. Hexane (5 mL) was added and then removed under vacuum, leaving behind an orange, sticky solid. The product was triturated with pentane and allowed to stir for 15 min. The product was collected by filtration, rinsed with pentane, and dried under vacuum. The reaction yielded 52 mg (0.10 mmol, 61% yield) of the product.

$^1$H NMR (400 MHz, Benzene-d$_6$) δ 9.26-9.06 (m, 2H), 8.95 (d, J=8.9 Hz, 2H), 8.20 (d, J=2.1 Hz, 2H), 7.41 (dd, J=8.9, 2.1 Hz, 2H), 7.19-7.08 (m, 14H), 7.02 (t, J=8.4 Hz, 1H), 6.94-6.89 (m, 1H), 6.61 (t, J=6.7 Hz, 2H), 6.38 (dd, J=8.3, 3.7 Hz, 4H), 3.42 (s, 12H), 2.10 (s, 2H), 1.38 (s, 19H), −0.11 (s, 8H), −0.39 (d, J=8.8 Hz, 2H) ppm. $^{13}$C NMR (101 MHz, Benzene-d$_6$) δ 167.30, 161.55 (d, J=2.0 Hz), 151.10, 143.11, 139.32, 136.34, 130.27, 128.96, 125.27 (d, J=10.9 Hz), 123.45, 117.52, 114.89 (d, J=4.4 Hz), 114.33, 104.85 (d, J=4.5 Hz), 55.54, 34.31, 31.72, 1.98, −16.17 (d, J=28.9 Hz) ppm $^{31}$P NMR (162 MHz, Benzene-d$_6$) δ 47.05 ppm.

Example 22—Synthesis of Procatalyst 5 ((Z)—N-(Bis(2,6-dimethoxyphenyl)phosphanyl)-2,7-bis(3,5-di-tert-butylphenyl)-9H-carbazole-9-carbimidate)(pyridine)(trimethylsilylmethyl)nickel(II)

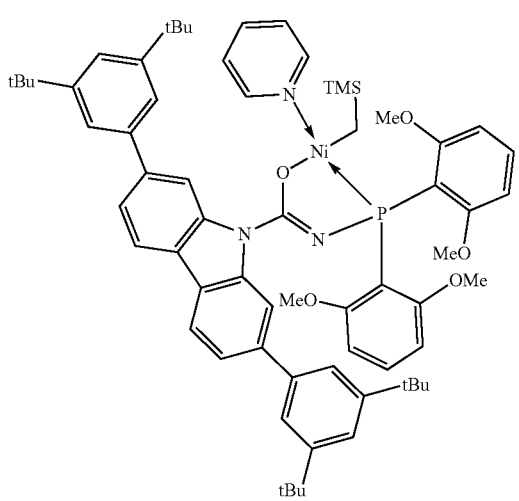

In a glove box, a 20-mL vial was charged with bis(trimethylsilylmethyl)bis(pyridine)nickel (46 mg, 0.12 mmol, 1.05 eq), a stir bar, and 1 mL of toluene. A solution of N-(bis(2,6-dimethoxyphenyl)phosphanyl)-2,7-bis(3,5-di-tert-butylphenyl)-9H-carbazole-9-carboxamide (100 mg, 0.11 mmol) in 5 mL of toluene was added slowly with stirring. The resulting solution was red and clear. The reaction mixture was stirred for 90 min at room temperature, and $^{31}$P NMR spectroscopic analysis of an aliquot showed only partial conversion to the desired nickel complex. The solution was heated to 45° C. for 20 min, and $^{31}$P NMR spectroscopic analysis of an aliquot showed that the reaction had achieved complete conversion to the desired nickel complex. The reaction mixture was filtered through a pad of Celite and all volatiles were removed from the filtrate under vacuum. Hexane (5 mL) was added to the resultant residue and then removed under vacuum, leaving behind an orange, sticky solid. The product was triturated with pentane and allowed to stir for 15 min. The product was collected by filtration, rinsed with pentane, and dried under vacuum. The $^1$H NMR spectrum of the product revealed the presence of some residual hexane. The reaction yielded 42 mg (0.04 mmol, 34% yield) of the product.

$^1$H NMR (400 MHz, Benzene-d$_6$) δ 9.18 (s, 2H), 8.89 (d, J=5.3 Hz, 2H), 7.97 (d, J=8.0 Hz, 2H), 7.60 (dd, J=7.9, 1.6 Hz, 2H), 7.54 (d, J=1.8 Hz, 4H), 7.48 (t, J=1.8 Hz, 2H), 7.07 (t, J=8.4 Hz, 2H), 6.67 (t, J=7.6 Hz, 1H), 6.35-6.22 (m, 6H), 3.33 (s, 12H), 1.29 (d, J=0.9 Hz, 36H), −0.18 (s, 9H), −0.48 (d, J=8.8 Hz, 2H) ppm. $^{13}$C NMR (126 MHz, C$_6$D$_6$) δ 166.91 (d, J=14.5 Hz), 161.41 (d, J=2.2 Hz), 150.82, 150.41, 143.27, 141.65, 140.76, 136.24, 130.33, 123.93, 123.22, 122.46, 121.10, 120.16, 119.14, 116.78, 114.09 (d, J=58.3 Hz), 104.79 (d, J=4.6 Hz), 55.40, 34.67, 31.48, 1.94, −15.82 (d, J=28.8 Hz). $^{31}$P NMR (202 MHz, C$_6$D$_6$) δ 46.53.

Example 23—Synthesis of Procatalyst 3 N-(Bis(2,6-diethoxyphenyl)phosphanyl)-carbazole-9-carboxamido(trimethylsilylmethyl)(pyridine)nickel

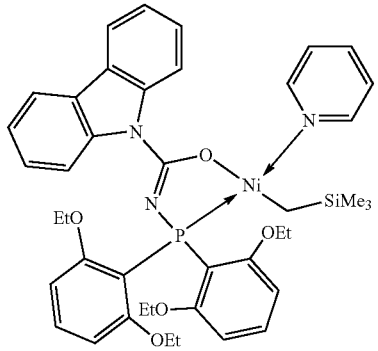

In a nitrogen-filled glovebox, bis(trimethylsilylmethyl)bis(pyridine)nickel (0.7100 g, 1.81 mmol) crystals were added to a solution of N-(bis(2,6-diethoxyphenyl)phosphanyl)-carbazole-9-carboxamide (1.00 g, 2.18 mmol) in toluene (8 mL) to give instantly a red-brown solution. Within a few minutes, the color turned lighter brown and then yellow precipitate began forming. The mixture was stirred for one hour at room temperature. The volatiles were then removed from the reaction mixture under reduced pressure. The resulting solid was triturated with hexane, filtered, washed with hexane, and dried under reduced pressure to give the product as a yellow powder. The reaction yielded 1.20 g (1.56 mmol, 86% yield) of the product.

$^1$H NMR (400 MHz, Benzene-d$_6$) δ 9.12 (dd, J=4.8, 1.8 Hz, 2H), 9.03 (s, 2H), 7.91 (d, J=7.6 Hz, 2H), 7.33 (t, J=7.8 Hz, 2H), 7.19 (t, J=7.4 Hz, 2H), 7.12 (d, J=8.3 Hz, 2H), 6.90 (tt, J=7.6, 1.7 Hz, 1H), 6.61 (t, J=6.6 Hz, 2H), 6.36 (dd, J=8.3, 3.7 Hz, 4H), 3.76 (dp, J=22.9, 7.8 Hz, 8H), 1.04 (t, J=7.0 Hz, 12H), −0.16 (s, 9H), −0.27 (d, J=8.1 Hz, 2H). $^{13}$C NMR (101 MHz, Benzene-d$_6$) δ 167.27 (d, J=14.1 Hz), 161.12 (d, J=1.9 Hz), 151.41 (d, J=1.4 Hz), 141.15, 136.78, 130.37, 125.90, 125.42, 123.74 (d, J=1.9 Hz), 121.07, 119.27, 118.16, 115.05 (d, J=59.2 Hz), 105.12 (d, J=4.6 Hz), 64.04, 14.59, 2.31, −15.97 (d, J=29.2 Hz). $^{31}$P NMR (162 MHz, Benzene-d$_6$) δ 46.29.

Example 24—Comparative Example—3-(bis(2,6-dimethoxyphenyl)phosphanyl)-1,1-dimethylurea bis(trimethylsilylmethyl) nickel (Compound (2))

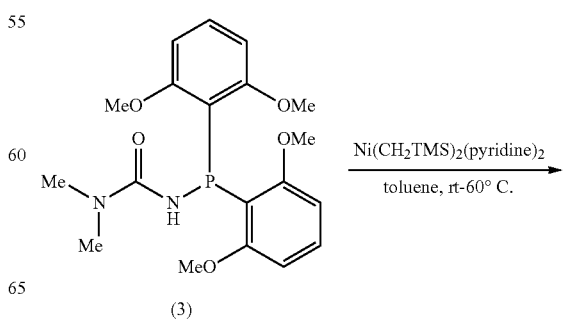

(3)

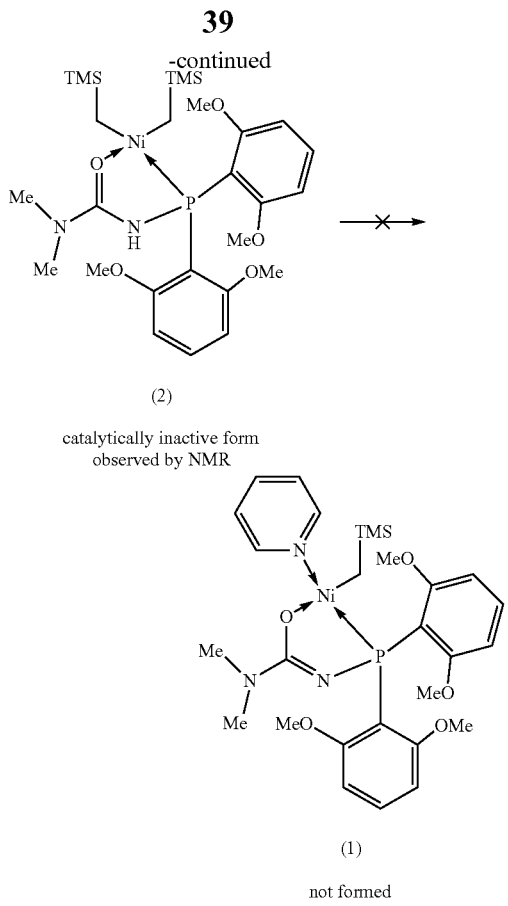

(2)
catalytically inactive form
observed by NMR (1)
not formed

N-alkyl phosphino-urea ligands, such as compound (3), did not proceed to the carbamimidic nickel complex (1) that is required for polymerization activity. As illustrated in the reaction above, in the case of compound (3), 3-(bis(2,6-dimethoxyphenyl)phosphanyl)-1,1-dimethylurea, compound (2), the corresponding amide complex, formed rapidly. However, the deprotonation of the ligand to form compound (1), the carbamimidate complex, did not occur. Without intent to be bound by theory, it is believed that N-aryl phosphino-urea ligands more readily form Ni complexes analogous to (1) than N-alkyl phosphino-urea ligands. The Ni carbamimidate complexes (1) are significantly more active in olefin polymerization catalysis.

Example 25—Ethylene/Tert-Butyl Acrylate Copolymerization—Parallel Pressure Reactor Studies Catalyst activity (in terms of quench time and polymer yield) and resulting polymer characteristics were assessed for Procatalysts 1-6. The polymerization reactions were carried out in a parallel pressure reactor (PPR), as previously described.

For these experiments, a stock solution of catalyst was prepared (1-2 mM) in toluene, and immediately delivered to the PPR reactor. Polymerization experiments were run at 400 psi ethylene pressure with 0.25-0.75 µmol catalyst loading. For copolymerizations, tert-butyl acrylate (t-BA) was purified by filtering it through a column of activated alumina, and for delivery to the PPR a solution of purified t-BA was prepared in toluene. Reactor temperature and tert-butyl acrylate loadings were varied as shown in Table 1. Each entry in Table 1 represents the average of at least 2 replicate runs.

TABLE 1

PPR Results for Phosphino-urea-supported Nickel Catalysts for Ethylene/tert-butyl Acrylate Copolymerization

| Entry | Catalyst (µmol) | Acrylate Loading (µmol) | Reactor Temp (° C.) | Activity (kg/mol · h) | Mw | PDI | Tm (° C.) | % Mol t-BA | Wt % t-BA | Yield (mg) |
|---|---|---|---|---|---|---|---|---|---|---|
| 1 | Procat. 1 (0.75) | 250 | 70 | 250 | 14,500 | 2.38 | 123 | 1.0 | 4.5 | 89 |
| 2 | Procat. 3 (0.75) | 250 | 70 | 1,500 | 146,000 | 2.58 | 128 | 0.3 | 1.5 | 150 |
| 3 | Procat. 4 (0.75) | 250 | 70 | 84 | 15,100 | 2.20 | 119 | 1.1 | 4.7 | 55 |
| 4 | Procat. 2 (0.75) | 250 | 70 | 540 | 24,100 | 2.21 | 124 | 0.7 | 3.0 | 110 |
| 5 | Procat. 5 (0.75) | 250 | 70 | 130 | 8,320 | 2.42 | 118 | 0.9 | 4.0 | 90 |
| 6 | Procat. 6 (0.50) | 250 | 70 | 700 | 158,000 | 2.54 | 130 | 0.2 | 1.0 | 115 |
| 7 | Procat. 1 (0.75) | 500 | 70 | 210 | 10,800 | 2.53 | 108 | 1.9 | 8.2 | 115 |
| 8 | Procat. 2 (0.75) | 500 | 90 | 450 | 11,700 | 2.04 | 116 | 0.7 | 3.1 | 110 |
| 9 | Procat. 1 (0.75) | 750 | 90 | 55 | 7,300 | 2.86 | 109 | 3.1 | 13 | 40 |
| 10 | Procat. 2 (0.75) | 750 | 100 | 110 | 7,180 | 2.24 | 114 | 1.8 | 7.8 | 90 |
| 11 | Procat. 3 (0.50) | 782 | 100 | 530 | 45,500 | 2.12 | 118 | 1.3 | 5.6 | 110 |
| 12 | Procat. 6 (0.50) | 750 | 90 | 160 | 47,000 | 2.26 | 121 | 0.9 | 3.8 | 80 |
| 13 | Procat. 3 (0.75) | 1000 | 90 | 240 | 40,400 | 2.15 | 115 | 1.7 | 7.2 | 110 |
| 14 | Procat. 3 (0.75) | 1250 | 90 | 130 | 33,600 | 2.13 | 113 | 1.9 | 8.3 | 100 |

Each of the procatalysts 1 to 6 is capable of copolymerizing ethylene and t-BA with high activities (such that the activity is greater than 20 kg/mol·hr). Additionally, each of the catalysts produced a polymer with significant amounts of acrylate incorporation, specifically, greater than 1.0 weight percent. In each of the polymerization reactions, the procatalyst of this disclosure produced polymer with narrow polydispersity index (PDI) (2.04 to 2.86) and molecular weights (MWs) ranging from 7,180 g/mol to 158,000 g/mol.

In another set of experiments, procatalyst complexes were prepared in situ by combining the phosphino-urea ligand and bis(trimethylsilylmethyl)bis(pyridine)nickel(II) in a 1:1 ratio in toluene and heating the mixture to 50° C. for 1 h prior to being delivered to the PPR. The PPR copolymerization results are summarized in Table 2. The values in Table 2 are an average of at least two replicates, with the exception of entry 5.

The phosphino-urea ligands are as follows:

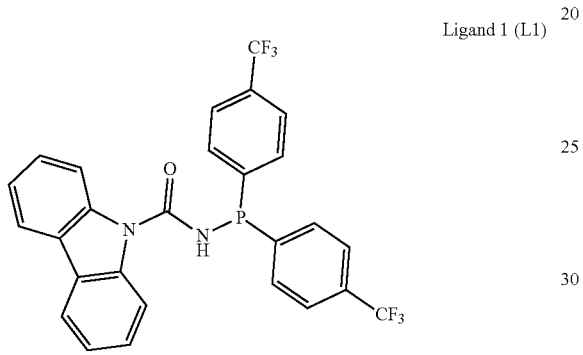

Ligand 1 (L1)

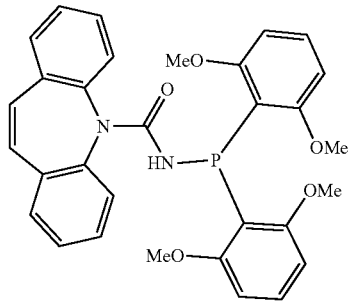

Ligand 2 (L2)

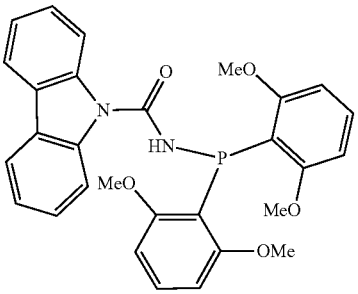

Ligand 3 (L3)

TABLE 2

Phosphino-urea Ligands Tested in the PPR using in situ Metallation
In situ metallated catalysts evaluated in the PPR

| Entry | Catalyst (μmol) | Acrylate Loading (μmol) | Reactor Temp (° C.) | Activity (kg/mol · h) | Mw | PDI | Tm (° C.) | % Mol t-BA | Wt % t-BA | Yield (mg) |
|---|---|---|---|---|---|---|---|---|---|---|
| 1 | L1 (1.25) | 250 | 90 | 55 | 483 | 1.43 | 44 | 0.4 | 2.0 | 75 |
| 2 | L3 (1.25) | 250 | 90 | 600 | 18,300 | 4.32 | 123 | 1.0 | 4.4 | 100 |
| 3 | L3 (1.25) | 0 | 90 | 41,000 | 10,700 | 3.70 | 117 | N/A | N/A | 284 |
| 4 | L2 (1.25) | 0 | 90 | 2,000 | 73,400 | 2.68 | 135 | N/A | N/A | 125 |

The results tabulated in Table 2 indicate that the metal-ligand complexes in which the $R^3$ and $R^4$ rings on the P atom are substituted in the 2- and 6-positions are significantly more active (i.e., L2 and L3) and produce polymers with higher MW than metal-ligand catalysts in which the $R^3$ and $R^4$ positions remain unsubstituted (i.e., L1). For example, the catalyst produced by complexing Ligand L1 with the nickel precursor had an activity of 55 kg/mol·hr and produced a polymer with a molecular weight (MW) of 483 g/mol. Ligand L1 includes 4-trifluoromethylphenyl groups in the $R^3$ and $R^4$ positions. The 4-trifluoromethylphenyl groups lack bulky substituents in the 2-position and the 6-position of the phenyl ring. Comparatively, the catalyst formed from complexing Ligand L3 and nickel had an activity of 600 kg/mol·hr and produced a polymer having a molecular weight of 18,300 g/mol. Ligand L3 includes 2,6-dimethoxyphenyl groups in the $R^3$ and $R^4$ positions. Entries 3 (L3) and 4 (L2) in Table 2 demonstrate high activity for ethylene homopolymerization when using metal-ligand complexes that have steric bulky groups located on the 2- and 6-positions of the aryl rings in the $R^3$ and $R^4$ positions.

Example 26—Ethylene/n-Butyl Acrylate Copolymerization—Parallel Pressure Reactor Studies For these experiments, a stock solution of catalyst was prepared (1-2 mM) in toluene, and immediately delivered to the PPR reactor. Polymerization experiments were run at 400 psi ethylene pressure with 0.25 µmol catalyst loading. For copolymerizations, n-butyl acrylate was purified by filtering it through a column of activated alumina, and for delivery to the PPR a solution of purified n-butyl acrylate was prepared in toluene. Reactor temperature and n-butyl acrylate loadings were varied as shown in Table 3. Each entry in Table 3 represents the average of at least 2 replicate runs.

The entries in Table 3 are primarily organized by acrylate loading although the temperature for certain runs may vary.

The relative trends in reactivity for tert-butyl acrylate copolymerization (Table 1) are observed for n-butyl acrylate (Table 3). Catalyst activity and the resulting copolymer molecular weight are inversely related to acrylate loading, whereas incorporation in directly related to acrylate loading.

It should be noted that, under identical acrylate loadings higher acrylate incorporation into the copolymer are observed for n-butyl acrylate versus tert-butyl acrylate. For example, Procat. 1 with 250 µmol n-butyl acrylate produces a polymer with 1.9 mol % acrylare incorporation (entry 2, Table 3), whereas under the similar conditions, but with 250 µmol tert-butyl acrylate 1.0 mol % incorporation (entry 1, Table 1) is observed. These results demonstrate that these Ni catalysts readily catalyze the formation of ethylene/acrylate copolymers with acrylates of both low steric bulk (n-BA) and high steric buk (t-BA).

Example 27—Ethylene/Acrylate Copolymerization—Batch Reactor Data

Ethylene/tert-butyl acrylate copolymerization reactions were catalyzed with a Ni(II) phosphino-urea complex (Procatalyst 3) on a larger scale in a 2-L batch reactor according to the general Batch Reactor procedure previously described. Copolymerization experiments were run at 400 psi ethylene pressure. Reactor temperature and tert-butyl acrylate loading were varied as shown in Table 4. tert-Butyl acrylate (t-BA) was purified by filtering it through a column of activated alumina prior to addition to the reactor. Initial charge of toluene to the reactor was 640 g (740 mL). The ethylene/tert-butyl acrylate copolymerization reactions were run for 75 minutes or until 40 g of ethylene uptake occurred, whichever was shorter.

TABLE 3

PPR Results for Phosphino-urea-supported Nickel Catalysts for Ethylene/n-butyl Acrylate Copolymerization

| Entry | Catalyst (µmol) | Acrylate Loading (µmol) | Reactor Temp (° C.) | Activity (kg/mol · h) | Mw | PDI | Tm (° C.) | % Mol n-BA | Wt % n-BA | Yield (mg) |
|---|---|---|---|---|---|---|---|---|---|---|
| 1 | Procat. 1 (0.25) | 125 | 70 | 500 | 14,900 | 2.36 | 122 | 1.0 | 4.2 | 100 |
| 2 | Procat. 1 (0.25) | 250 | 70 | 230 | 8,180 | 2.19 | 113 | 1.9 | 8.2 | 60 |

Performance data is summarized in Table 4.

TABLE 4

Performance of Procatalyst 3 in a 2-L Batch Reactor at 400 psi Ethylene

| Entry | Catalyst (µmol) | Acrylate Loading (mmol) | Reactor Temp (° C.) | Activity (kg/mol · h) | Mw | PDI | Tm (° C.) | % Mol t-BA | Yield (g) |
|---|---|---|---|---|---|---|---|---|---|
| 1 | Procatalyst 3 (178) | 74 | 90 | 1,300 | 60,700 | 2.13 | 121 | 0.9 | 39.2 |
| 2 | Procatalyst 3 (178) | 222 | 90 | 490 | 35,100 | 2.09 | 114 | 2.3 | 49.4 |
| 3 | Procatalyst 3 (178) | 74 | 110 | 2,400 | 40,100 | 2.12 | 122 | 1.1 | 40.1 |
| 4 | Procatalyst 3 (178) | 222 | 110 | 690 | 21,900 | 2.21 | 113 | 2.7 | 47.0 |

As shown in Table 4, Procatalyst 3 was run in the batch reactor at two different temperatures (90° C. and 110° C.) and two different t-BA loadings (74 mmol or 222 mmol of tert-butyl acrylate). In entry 1, at 90° C. with 74 mmol of t-BA present in the reactor, Procatalyst 3 had an activity of 1,300 kg/mol·h and produced 39.2 g of copolymer with molecular weight of 60,700 g/mol and an acrylate incorporation of 0.9 mol %. In entry 2, the acrylate incorporation more than doubled when 222 mmol of t-BA was added to the reactor, when compared to entry 1. However, the increased amount of acrylate incorporated into the polymer affected the molecular weight of the polymer. As reflected in entry 2, the molecular weight decreased to 35,100 g/mol and had an activity of 490 kg/mol·h, when compared to the results in entry 1.

The invention claimed is:

1. A procatalyst according to formula (I):

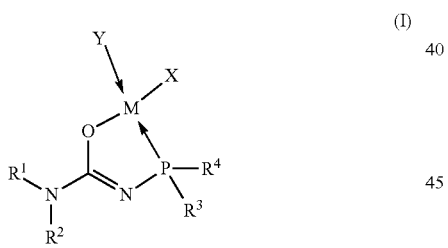

where:

M is nickel (II) or palladium (II);

X is a ligand chosen from $(C_1-C_{40})$hydrocarbyl, $(C_1-C_{40})$heterohydrocarbyl, $-CH_2Si(R^C)_{3-Q}(OR^C)_Q$, $-Si(R^C)_{3-Q}(OR^C)_Q$, $-OSi(R^C)_{3-Q}(OR^C)_Q$, $-Ge(R^C)_{3-Q}(OR^C)_Q$, $-P(R^C)_{2-W}(OR^C)_W$, $-P(O)(R^C)_{2-W}(OR^C)_W$, $-N(R^C)_2$, $-N(Si(R^C)_3)_2$, $-NR^CSi(R^C)_3$, $OR^C$, $-SR^C$, $-NO_2$, $-CN$, $-CF_3$, $OCF_3$, $-S(O)R^C$, $-S(O)_2R^C$, $-OS(O)_2R^C$, $-N=C(R^C)_2$, $-N=CH(R^C)$, $-N=CH_2$, $-N=P(R^C)_3$, $-OC(O)R^C$, $-C(O)OR^C$, $-C(O)R^C$, $-C(O)H-N(R^C)C(O)R^C$, $-N(R^C)C(O)H$, $-NHC(O)R^C$, $-NHC(O)H$, $-C(O)N(R^C)_2$, $C(O)NHR^C$, $-C(O)NH_2$, a halogen, or a hydrogen, wherein:

each $R^C$ is independently $(C_1-C_{30})$hydrocarbyl or $(C_1-C_{30})$heterohydrocarbyl and is optionally substituted with one or more $R^S$, Q is 0, 1, 2, or 3; and W is 0, 1, or 2;

Y is a Lewis base optionally covalently connected to X;

$R^1$ and $R^2$ are chosen from $(C_6-C_{40})$ aryl or $(C_1-C_{40})$ heteroaryl and are optionally substituted with one or more $R^8$;

$R^3$ and $R^4$ are independently selected from radicals having formula (II):

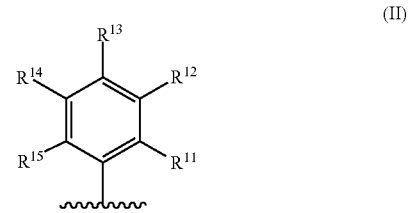

where:

$R^{11}$, $R^{12}$, $R^{13}$, $R^{14}$, and $R^{15}$ are independently $(C_1-C_{30})$ hydrocarbyl, $(C_1-C_{30})$heterohydrocarbyl, $-OR^N$, $-NR^N_2$, $-SR^N$, halogen or $-H$, where each $R^N$ is $(C_1-C_{30})$hydrocarbyl, provided that at least one of $R^{11}$ and $R^{15}$ is not-H;

each $R^C$ in formula (I) is independently a $(C_1-C_{30})$hydrocarbyl, $(C_1-C_{30})$heterohydrocarbyl, or $-H$; and each $R^8$ in formula (I) is independently $(C_1-C_{20})$hydrocarbyl or halogen.

2. The procatalyst according to claim 1, wherein Y is a neutral Lewis basic aprotic $(C_2-C_{40})$ heterohydrocarbon.

3. The procatalyst according to claim 1, wherein $R^3$ and $R^4$ are identical.

4. The procatalyst according to claim 3, wherein $R^{11}$ and $R^{15}$ are independently $-O[(C_1-C_{10})alkyl]$.

5. The procatalyst according to claim 3, wherein $R^{11}$ and $R^{15}$ are methoxy.

6. The procatalyst according to claim 3, wherein $R^{11}$ and $R^{15}$ are ethoxy.

7. The procatalyst according to claim 3, wherein $R^{11}$ and $R^{15}$ are independently $-N[(C_1-C_{10})alkyl]_2$.

8. The procatalyst according to claim 1, wherein $R^1$ and $R^2$ are connected and the procatalyst has the structure according to formula (III):

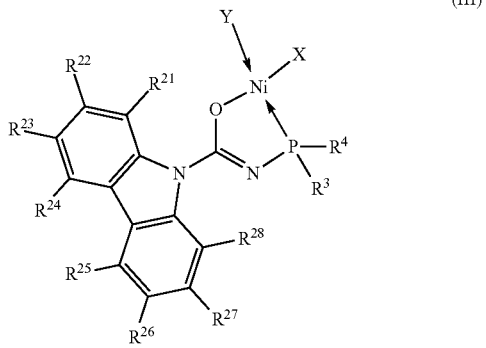

(III)

where each of $R^{21-28}$ is independently chosen from —H, $(C_1-C_{40})$hydrocarbyl, $(C_1-C_{40})$heterohydrocarbyl, —Si$(R^R)_3$, —Ge$(R^R)_3$, —P$(R^R)_2$, —P(O)$(R^R)_2$, —N$(R^R)_2$, —OR$^R$, —SR$^R$, —NO$_2$, —CN, —CF$_3$, or halogen, where each $R^R$ is $(C_1-C_{30})$hydrocarbyl, $(C_1-C_{30})$heterohydrocarbyl, or —H; and M, Y, X, $R^3$, and $R^4$ are as defined in formula (I).

9. The procatalyst according to claim 8, wherein $R^{22}$ and $R^{27}$ are independently $(C_6-C_{40})$ aryl optionally substituted with $R^S$, where $R^S$ is $(C_1-C_{30})$hydrocarbyl, —CF$_3$, or halogen atom.

10. The procatalyst according to claim 9, wherein $R^{22}$ and $R^{27}$ are independently 3,5-bis(trifluoromethyl)phenyl or 3,5-di-tert-butylphenyl.

11. The procatalyst according to claim 8, wherein $R^{22}$ and $R^{27}$ are independently $(C_1-C_{20})$alkyl.

12. The procatalyst according to claim 8, wherein $R^{23}$ and $R^{26}$ are independently $(C_6-C_{40})$ aryl optionally substituted with $R^S$, where $R^S$ is $(C_1-C_{30})$hydrocarbyl, —CF$_3$, or halogen atom.

13. The procatalyst according to claim 1, where $R^1$ and $R^2$ are $(C_6-C_{40})$ aryl substituted with at least one $R^S$, where each $R^S$ is independently $(C_1-C_{30})$hydrocarbyl, —CF$_3$, or halogen atom.

14. The procatalyst according to claim 1, where $R^1$ and $R^2$ are independently phenyl, 3,5-bis(trifluoromethyl)phenyl, or 3,5-di-tert-butylphenyl.

15. The procatalyst according to claim 1, wherein X is —CH$_2$Si(CH$_3$)$_3$.

16. A polymerization process comprising polymerizing ethylene and optionally one or more $(C_3-C_{10})$α-olefin monomers or optionally one or more cyclic olefin monomers in the presence of a procatalyst according to claim 1.

17. A polymerization process comprising polymerizing ethylene, polar comonomer, and optionally one or more $(C_3-C_{10})$α-olefin monomers or optionally one or more cyclic olefin monomers in the presence of a procatalyst according to claim 1.

18. The polymerization process according to claim 16, wherein the polar comonomer is chosen from acrylate (CH$_2$=CHC(O)(OR)), glycidyl acrylate, CH$_2$=CH(CH$_2$)$_n$C(O)(OR), CH$_2$=CHC(O)R, CH$_2$=CH(CH$_2$)$_n$C(O)R, CH$_2$=CH—OC(O)R, CH$_2$=CH(CH$_2$)$_n$—OC(O)R, CH$_2$=CH(OR), CH$_2$=CH(CH$_2$)$_n$(OR), CH$_2$=CHSi(R)$_{3-T}$(OR)$_T$, CH$_2$=CH(CH$_2$)$_n$Si(R)$_{3-T}$(OR)$_T$, CH$_2$=CH—OSi(R)$_{3-T}$(OR)$_T$, CH$_2$=CH(CH$_2$)$_n$—OSi(R)$_{3-T}$(OR)$_T$ or CH$_2$=CHCl where each R is chosen from —H, substituted $(C_1-C_{30})$hydrocarbyl, unsubstituted $(C_1-C_{30})$hydrocarbyl, substituted $(C_1-C_{30})$heterohydrocarbyl, or unsubstituted $(C_1-C_{30})$heterohydrocarbyl; each T is 0, 1, 2, or 3; and each n is 1 to 10.

19. The polymerization process according to claim 18, wherein the polar comonomer is tert-butyl acrylate.

20. The polymerization process according to claim 18, wherein the polar comonomer is n-butyl acrylate.

* * * * *